US012206175B2

(12) United States Patent
Song et al.

(10) Patent No.: US 12,206,175 B2
(45) Date of Patent: Jan. 21, 2025

(54) ANTENNA AND ELECTRONIC DEVICE INCLUDING THE SAME

(71) Applicant: Samsung Electronics Co., Ltd., Suwon-si (KR)

(72) Inventors: Keumsu Song, Suwon-si (KR); Younghak Sin, Suwon-si (KR); Byungchan Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 17/578,916

(22) Filed: Jan. 19, 2022

(65) Prior Publication Data

US 2022/0224021 A1 Jul. 14, 2022

Related U.S. Application Data

(63) Continuation of application No. PCT/KR2022/000039, filed on Jan. 4, 2022.

(30) Foreign Application Priority Data

Jan. 12, 2021 (KR) ........................ 10-2021-0003810

(51) Int. Cl.
*H01Q 21/08* (2006.01)
*H01Q 21/24* (2006.01)
(Continued)

(52) U.S. Cl.
CPC ............. *H01Q 21/08* (2013.01); *H01Q 21/24* (2013.01); *H01Q 21/30* (2013.01); *H01Q 1/243* (2013.01)

(58) Field of Classification Search
CPC ........ H01Q 21/08; H01Q 21/24; H01Q 21/30; H01Q 1/243; H01Q 21/28; H01Q 23/00
See application file for complete search history.

(56) References Cited

U.S. PATENT DOCUMENTS 4,131,896 A * 12/1978 Miller .................... H01Q 19/06 343/815
7,983,721 B2 * 7/2011 Ying ...................... H01Q 1/243 343/702
(Continued)

FOREIGN PATENT DOCUMENTS

JP 2003-078339 A 3/2003
KR 10-2020-0061178 A 6/2020
(Continued)

OTHER PUBLICATIONS

International Search Report and written opinion dated Apr. 12, 2022, issued in International Application No. PCT/KR2022/000039.

*Primary Examiner* — Hai V Tran
(74) *Attorney, Agent, or Firm* — Jefferson IP Law, LLP

(57) ABSTRACT

An electronic device is provided. The electronic device includes a housing including a conductive part coupled to a non-conductive, an antenna structure including a substrate disposed in an internal space of the housing and at least one antenna element disposed to form a beam pattern in a first direction in the substrate, at least one conductive dummy plate disposed between the at least one antenna element and the housing in the internal space, and a wireless communication circuit configured to transmit and/or receive a wireless signal in a specified frequency band through the at least one antenna element. The antenna structure is disposed at a position at least partially overlapped with the non-conductive part, and the at least one conductive dummy plate is disposed at a position at least partially overlapped with the at least one antenna element, when the housing is viewed from the outside of the electronic device.

20 Claims, 27 Drawing Sheets

(51) Int. Cl.
*H01Q 21/30* (2006.01)
*H01Q 1/24* (2006.01)

(56) References Cited

U.S. PATENT DOCUMENTS

| | | | | |
|---|---|---|---|---|
| 8,237,518 | B2 * | 8/2012 | Andreasson | H01P 1/205 333/203 |
| 10,749,248 | B1 * | 8/2020 | Malik | H01Q 1/243 |
| 10,840,583 | B2 * | 11/2020 | Lee | H01Q 1/245 |
| 2011/0043424 | A1 * | 2/2011 | Lee | H01Q 25/001 343/816 |
| 2017/0069958 | A1 * | 3/2017 | Ko | H01Q 1/38 |
| 2017/0125895 | A1 * | 5/2017 | Baks | H01Q 23/00 |
| 2018/0123222 | A1 * | 5/2018 | Jang | H01Q 19/005 |
| 2018/0159203 | A1 * | 6/2018 | Baks | H01Q 9/045 |
| 2018/0219281 | A1 * | 8/2018 | Sudo | H01Q 21/0006 |
| 2018/0331418 | A1 * | 11/2018 | Kim | H01Q 1/243 |
| 2019/0006731 | A1 | 1/2019 | Chiu | |
| 2019/0020100 | A1 * | 1/2019 | Jong | H01Q 1/48 |
| 2019/0103652 | A1 * | 4/2019 | Chuang | H01L 24/20 |
| 2019/0288382 | A1 * | 9/2019 | Kamgaing | H01Q 21/22 |
| 2019/0333882 | A1 * | 10/2019 | Kamgaing | H01L 23/49827 |
| 2019/0386380 | A1 * | 12/2019 | Ham | H01Q 1/243 |
| 2020/0013735 | A1 * | 1/2020 | Liu | H01L 23/481 |
| 2020/0161766 | A1 * | 5/2020 | Liu | H01Q 9/045 |
| 2020/0203804 | A1 * | 6/2020 | Khripkov | H01Q 1/243 |
| 2020/0212584 | A1 | 7/2020 | Park et al. | |
| 2020/0227832 | A1 * | 7/2020 | Nemoto | H01Q 1/38 |
| 2020/0259243 | A1 | 8/2020 | Jeon et al. | |
| 2020/0266521 | A1 | 8/2020 | Jeong et al. | |
| 2020/0358165 | A1 | 11/2020 | Jeong et al. | |
| 2020/0365972 | A1 | 11/2020 | Jeon et al. | |
| 2020/0411978 | A1 | 12/2020 | Jeon et al. | |
| 2021/0044011 | A1 * | 2/2021 | Liu | H01Q 21/065 |
| 2021/0328362 | A1 | 10/2021 | Park et al. | |
| 2023/0114757 | A1 * | 4/2023 | Fabrega Sanchez | H01Q 21/062 343/772 |

FOREIGN PATENT DOCUMENTS

| | | | |
|---|---|---|---|
| KR | 10-2020-0081760 | A | 7/2020 |
| KR | 10-2020-0098145 | A | 8/2020 |
| KR | 10-2020-0099813 | A | 8/2020 |
| KR | 10-2020-0131731 | A | 11/2020 |
| KR | 10-2021-0001709 | A | 1/2021 |
| WO | 2020/141692 | A1 | 7/2020 |

* cited by examiner

ANTENNA AND ELECTRONIC DEVICE INCLUDING THE SAME

CROSS-REFERENCE TO RELATED APPLICATION(S)

This application is a continuation application, claiming priority under § 365(c), of an International application No. PCT/KR2022/000039, filed on Jan. 4, 2022, which is based on and claims the benefit of a Korean patent application number 10-2021-0003810, filed on Jan. 12, 2021, in the Korean Intellectual Property Office, the disclosure of which is incorporated by reference herein in its entirety.

TECHNICAL FIELD

The disclosure relates to an antenna and an electronic device including the same.

BACKGROUND ART

With the development of wireless communication technology, electronic devices (e.g., electronic devices for communication) are commonly used in daily life, and thus the use of contents is increasing exponentially. Due to the rapid increase in contents use, a network capacity is gradually reaching a limit thereof, and after the commercialization of 4th generation (4G) communication system, in order to meet the increasing demand for wireless traffic data, a communication system (e.g., 5th generation (5G), pre-5G communication system, or new radio (NR)) that transmits and/or receives a signal using a frequency of high-frequency (e.g., mmWave) bands (e.g., 3 GHz to 300 GHz bands) is being researched.

The above information is presented as background information only to assist with an understanding of the disclosure. No determination has been made, and no assertion is made, as to whether any of the above might be applicable as prior art with regard to the disclosure.

DISCLOSURE

Technical Problem

Next-generation wireless communication technology may substantially transmit and receive wireless signals using a frequency in a range of 3 GHz to 100 GHz, and an efficient mounting structure for overcoming a high free space loss due to frequency characteristics and for increasing a gain of an antenna, and a new antenna structure (e.g., antenna module) corresponding thereto is being developed. The antenna structure may include an array antenna in which the various number of antenna elements (e.g., conductive patches and/or conductive patterns) are disposed at regular intervals in a dielectric structure (e.g., substrate). These antenna elements may be disposed to form a beam pattern in any one direction inside the electronic device. For example, the antenna structure may be disposed to form a beam pattern toward at least a portion of a front surface, a rear surface, and/or a side surface in an internal space of the electronic device.

In order to reinforce rigidity and form a beautiful appearance, the electronic device may include a conductive part (e.g., metal member) disposed in at least a portion of the housing and a non-conductive part (e.g., polymer member) coupled to the conductive part. The conductive part may be at least partially omitted in a portion facing an antenna structure disposed in the internal space of the electronic device, and the omitted portion may be replaced with the non-conductive part.

However, the conductive part disposed close to the antenna structure may be disposed to at least partially cover a radiation direction of a beam pattern of the antenna structure, and such a disposition structure may deteriorate a radiation performance of the antenna structure. In order to solve such a problem, the conductive part may be disposed at a position relatively far from the antenna structure, but this may cause a decrease in rigidity of the electronic device.

Aspects of the disclosure are to address at least the above-mentioned problems and/or disadvantages and to provide at least the advantages described below. Accordingly, an aspect of the disclosure is to provide an antenna and an electronic device including the same constituted to reduce radiation performance degradation through conductive additional structures disposed at a periphery of an antenna structure.

Another aspect of the disclosure is to provide an antenna and an electronic device including the same, which can help to reinforce rigidity of the electronic device by reducing radiation performance degradation even though a conductive part is disposed near an antenna structure.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a conductive part and a non-conductive part coupled to the conductive part, an antenna structure including a substrate disposed in an internal space of the housing and at least one antenna element disposed to form a beam pattern in a first direction in the substrate, at least one conductive dummy plate disposed between the at least one antenna element and the housing in the internal space of the housing, and a wireless communication circuit configured to transmit and/or receive a wireless signal in a specified frequency band through the at least one antenna element, wherein the antenna structure is disposed at a position at least partially overlapped with the non-conductive part when the housing is viewed from the outside, and the at least one conductive dummy plate is disposed at a position at least partially overlapped with the at least one antenna element when the housing is viewed from the outside.

In accordance with another aspect of the disclosure, an electronic device is provided. The electronic device includes a housing including a conductive part and a non-conductive part coupled to the conductive part, and an antenna structure disposed in the housing, wherein the antenna structure includes a dielectric structure, at least one conductive patch disposed to form a beam pattern in a first direction in the dielectric structure, and at least one conductive dummy plate disposed between the at least one conductive patch and the housing in the dielectric structure, and a wireless communication circuit configured to transmit and/or receive a wireless signal in a specified frequency band through the at least one conductive patch, wherein the antenna structure is disposed at a position at least partially overlapped with the non-conductive part when the housing is viewed from the outside, and the at least one conductive dummy plate is disposed at a position at least partially overlapped with the at least one conductive patch when the housing is viewed from the outside.

Advantageous Effects

An antenna structure according to an embodiment of the disclosure can reduce radiation performance degradation by expanding a beam width in a designated direction through a conductive dummy plate spaced apart at a specified interval from at least one antenna element in a radiation direction. Further, because the conductive part of the housing may be disposed near the antenna structure while reducing radiation performance degradation of the antenna structure by the conductive dummy plate, thereby helping to reinforce rigidity of the electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
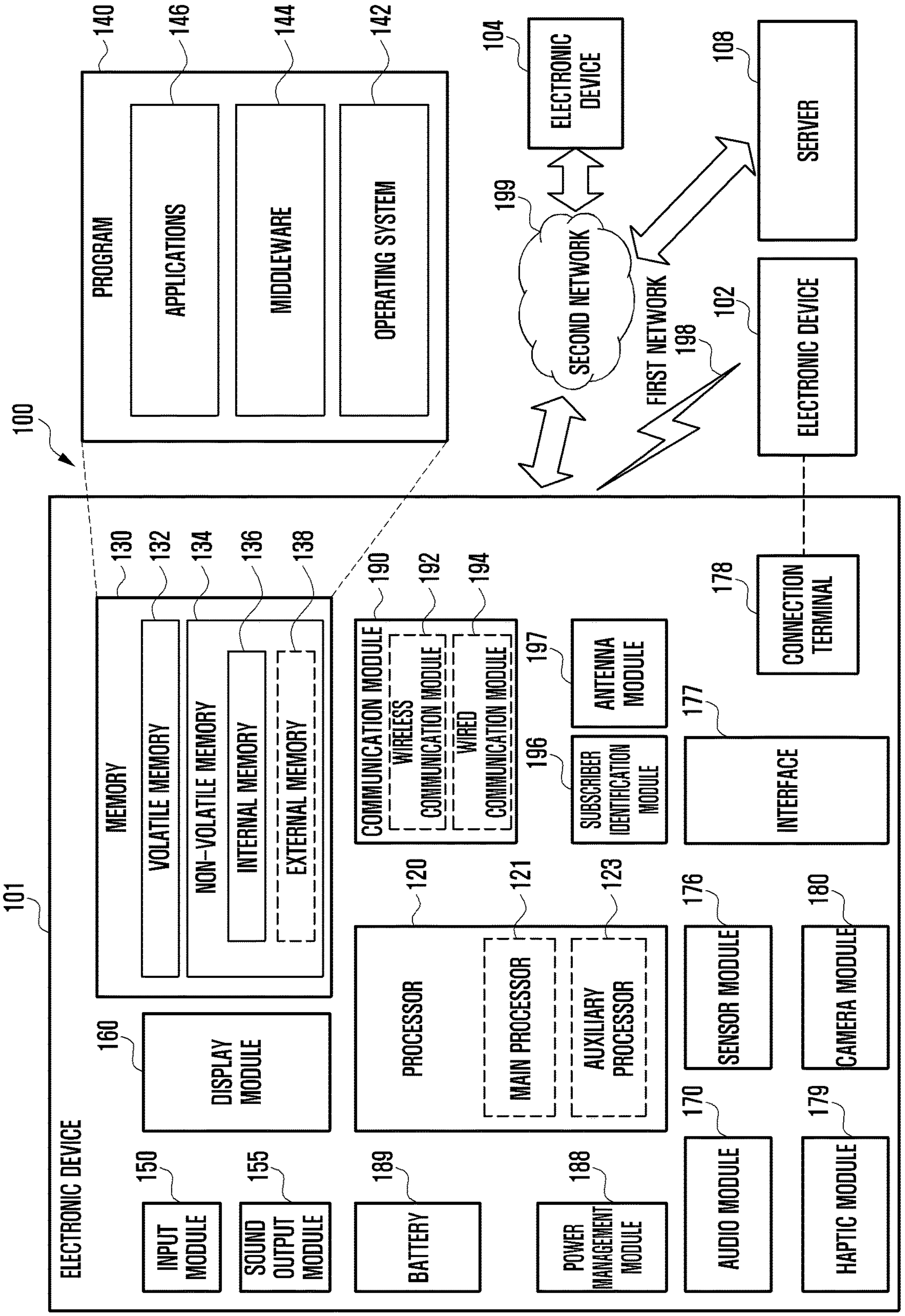
FIG. 1 is a block diagram illustrating an electronic device in a network environment according to an embodiment of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display module 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and/or external memory 138.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming call. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
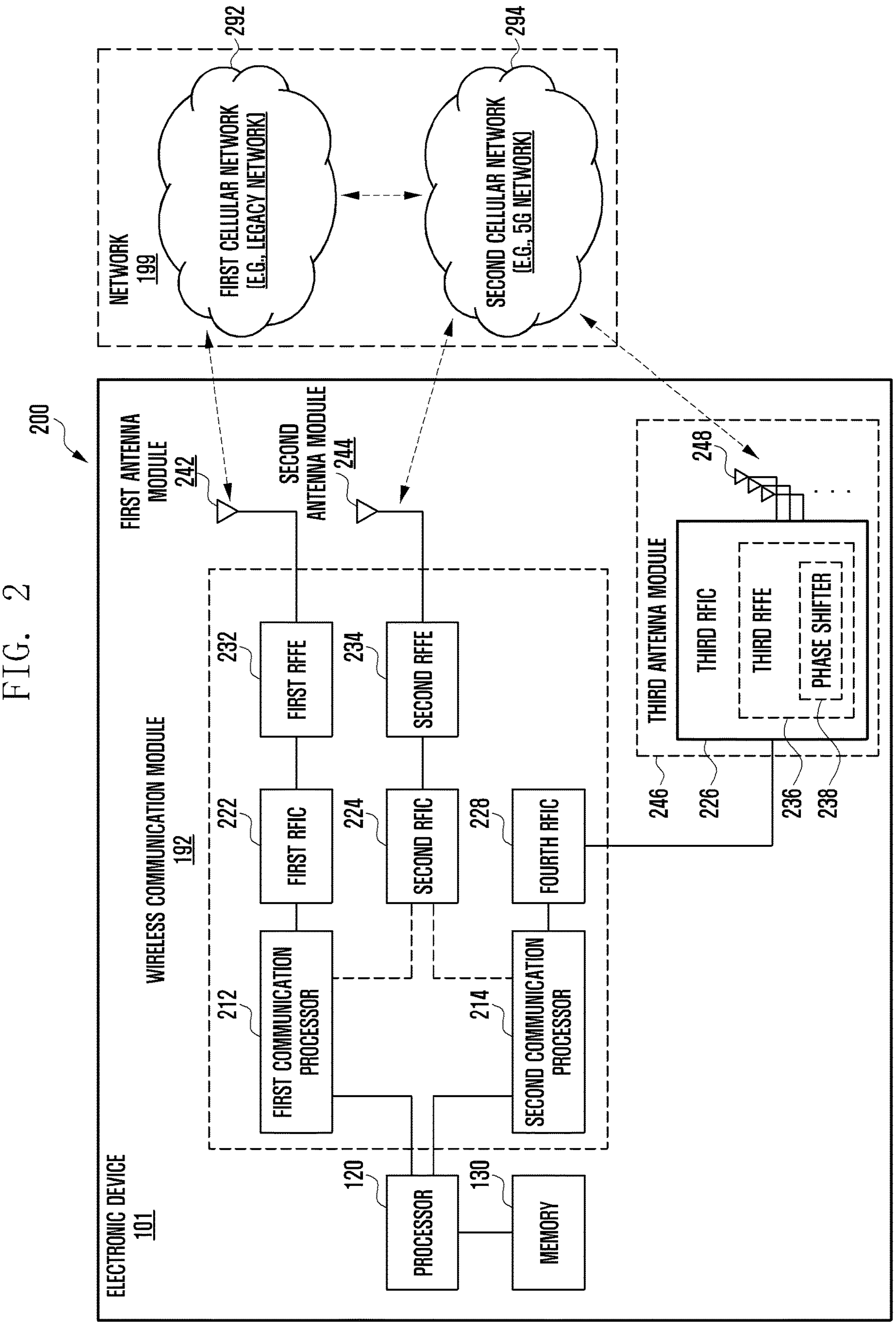
FIG. 2 is a block diagram illustrating an electronic device for supporting legacy network communication and 5G network communication according to an embodiment of the disclosure.

FIG. 2 is a block diagram illustrating an electronic device in a network environment including a plurality of cellular networks according to an embodiment of the disclosure.

Referring to FIG. 2, the electronic device 101 in the network environment 200 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), third generation (3G), 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in third generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN) and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
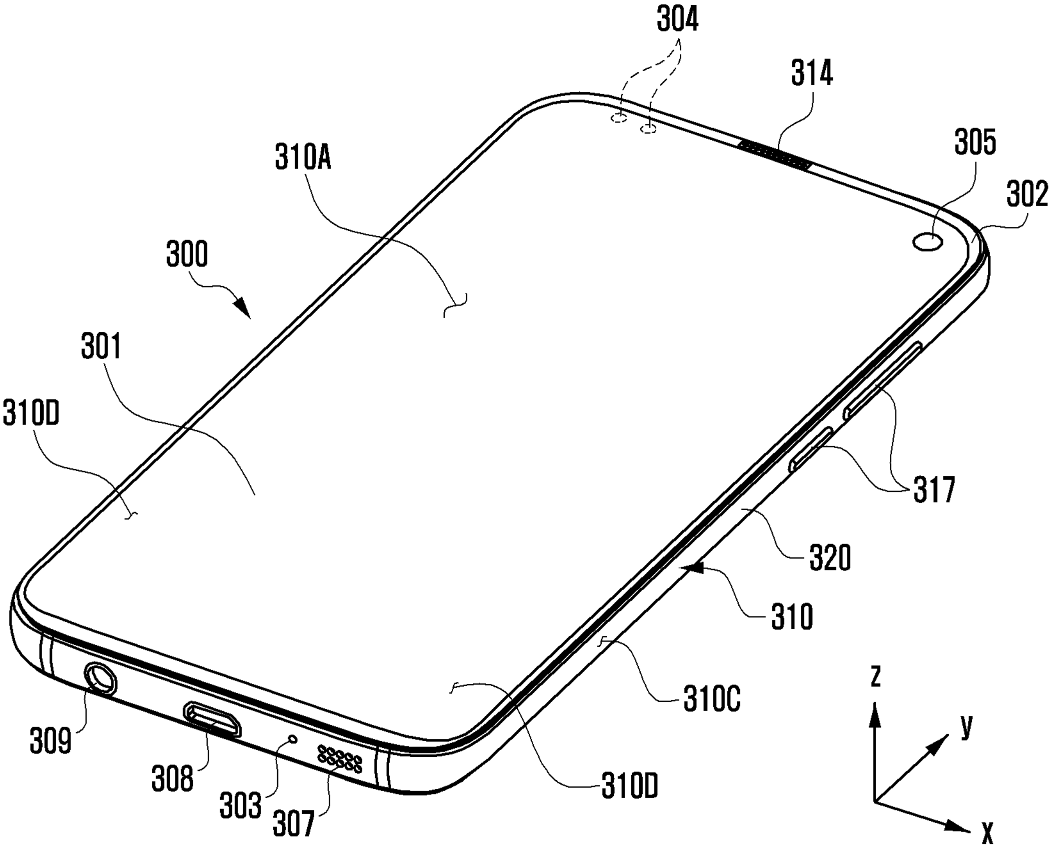
FIG. 3A is a perspective view illustrating a mobile electronic device according to an embodiment of the disclosure.
Figure 3B:
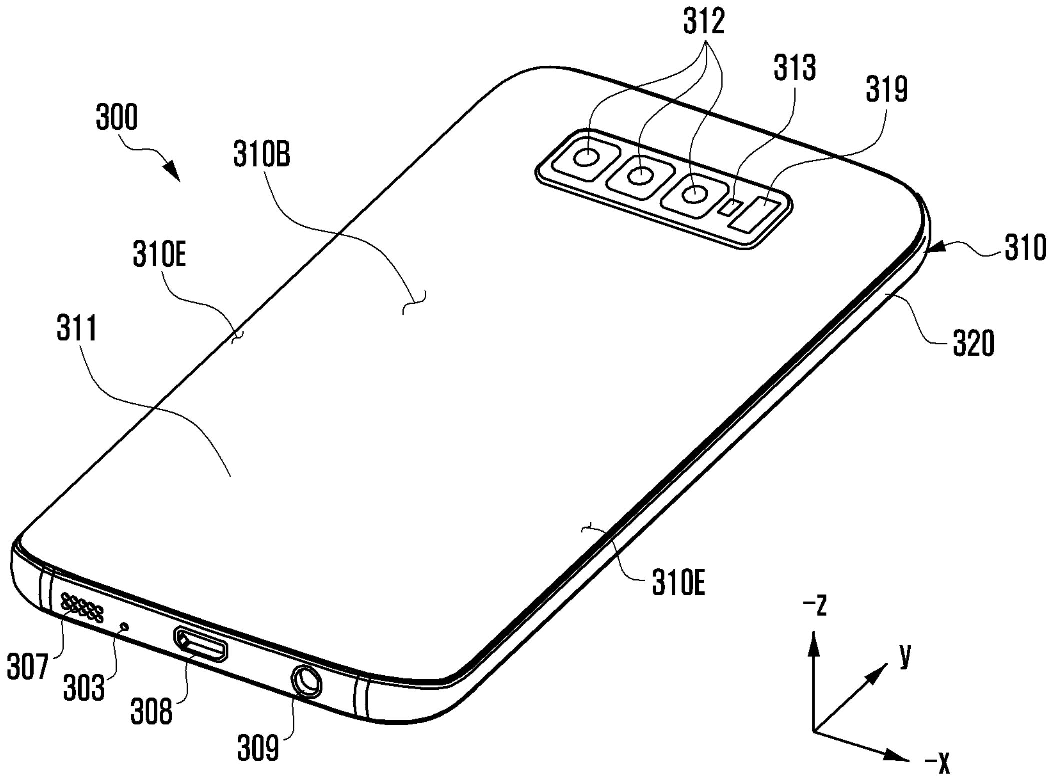
FIG. 3B is a rear perspective view illustrating a mobile electronic device according to an embodiment of the disclosure.

FIG. 3A illustrates a perspective view showing a front surface of a mobile electronic device according to an embodiment of the disclosure, and FIG. 3B illustrates a perspective view showing a rear surface of the mobile electronic device shown in FIG. 3A according to an embodiment of the disclosure.

The mobile electronic device 300 in FIGS. 3A and 3B may be at least partially similar to the electronic device 101 in FIG. 1 or may further include other embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be exposed through a substantial portion of the front plate 302, for example. At least a part of the display 301 may be exposed through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the exposed area of the display 301.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The mobile electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the mobile electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the mobile electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the mobile electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of a mobile electronic device 300 so as to be brought into contact with an external environment through an opening of the display 301, which is perforated up to a front plate 302. In another embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
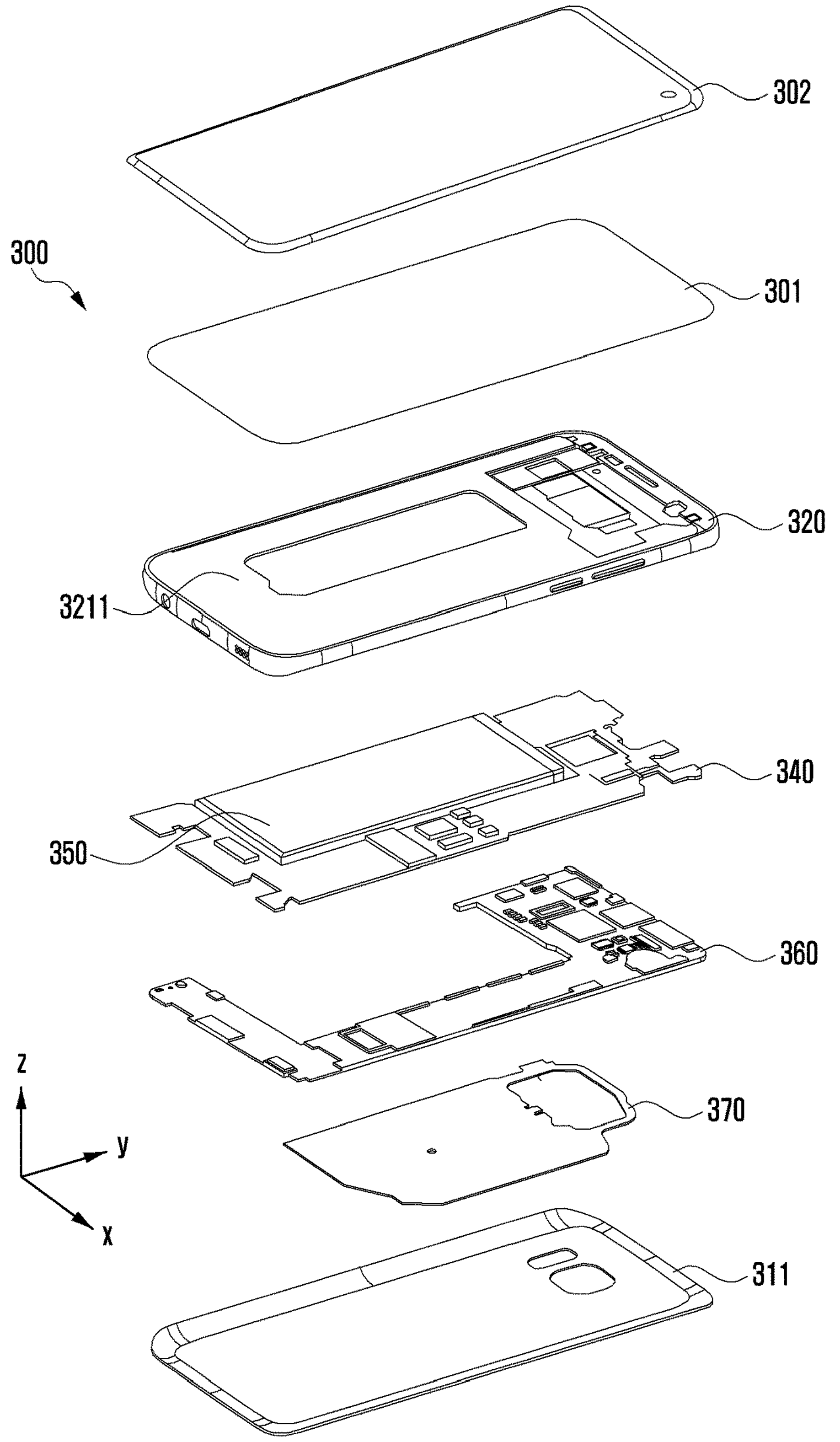
FIG. 3C is an exploded perspective view illustrating a mobile electronic device according to an embodiment of the disclosure.

FIG. 3C illustrates an exploded perspective view showing a mobile electronic device shown in FIG. 3A according to an embodiment of the disclosure.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the mobile electronic device 300 may be the same as or similar to those of the mobile electronic device 101 shown in FIG. 3A or FIG. 3B, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3111.

Figure 4A:
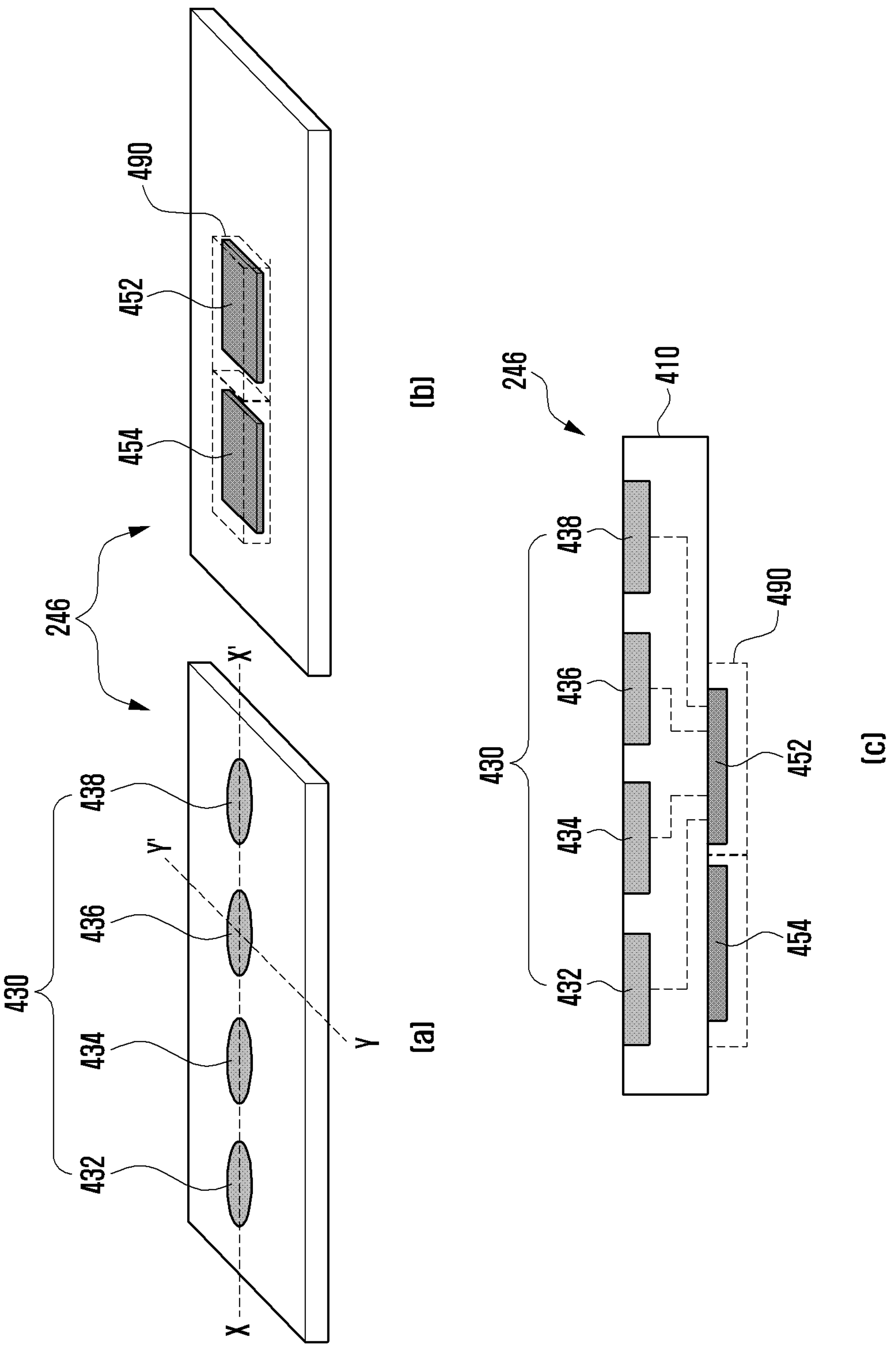
FIG. 4A illustrates an embodiment of a structure of a third antenna module described with reference to FIG. 2 according to an embodiment of the disclosure.

FIG. 4A is a diagram illustrating a structure of, for example, a third antenna module described with reference to FIG. 2 according to an embodiment of the disclosure. FIG. 4A(a) is a perspective view illustrating the third antenna module 246 viewed from one side, and FIG. 4A(b) is a perspective view illustrating the third antenna module 246 viewed from the other side. FIG. 4A(c) is a cross-sectional view illustrating the third antenna module 246 taken along line X-X' of FIG. 4A.

With reference to FIG. 4A, in one embodiment, the third antenna module 246 may include a printed circuit board 410, an antenna array 430, a RFIC 452, and a PMIC 454. Alternatively, the third antenna module 246 may further include a shield member 490. In other embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to another embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to one embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to another embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to one embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
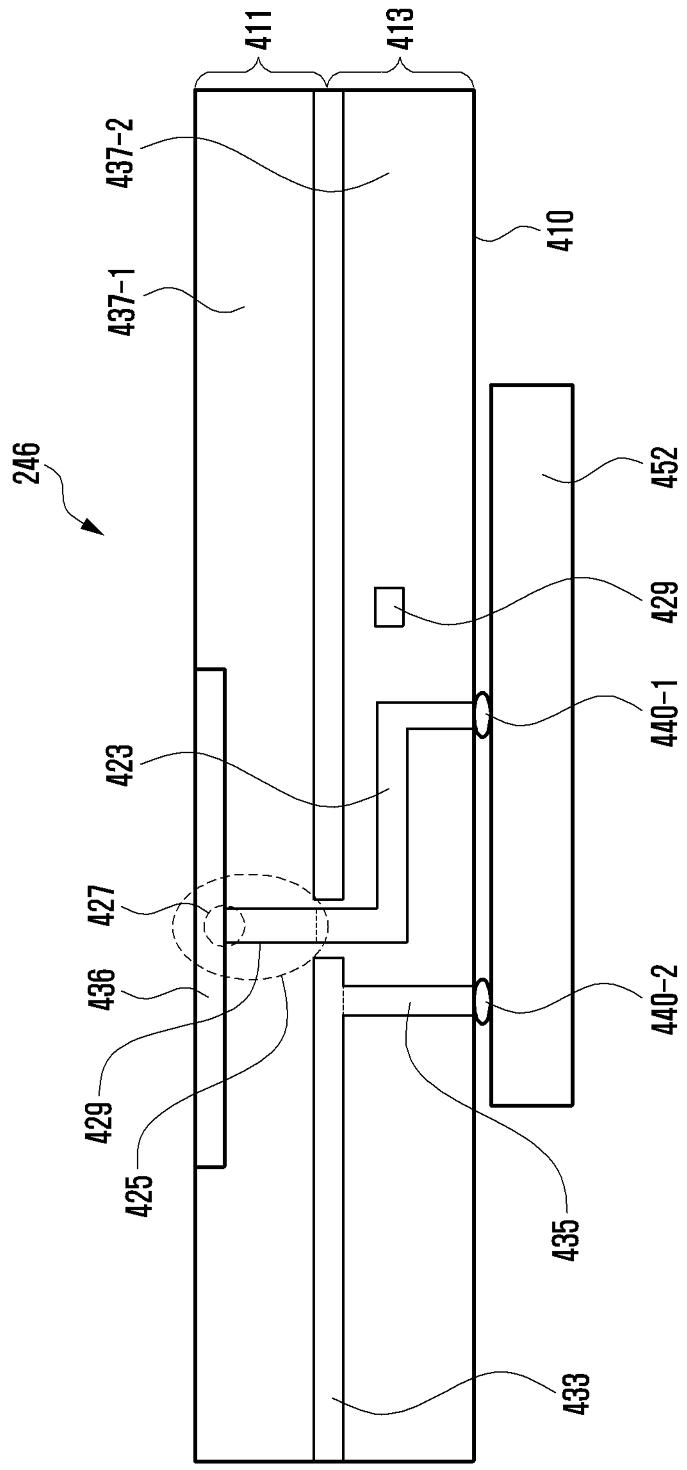
FIG. 4B is a cross-sectional view illustrating a third antenna module taken along line Y-Y' of part (a) of FIG. 4A according to an embodiment of the disclosure.

FIG. 4B is a cross-sectional view illustrating the third antenna module 246 taken along line Y-Y' of FIG. 4A(a) according to an embodiment of the disclosure. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of FIG. 4A(c) may be electrically connected to the network layer 413 through, for example, first and second solder bumps 440-1 and 440-2. In other embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5A:
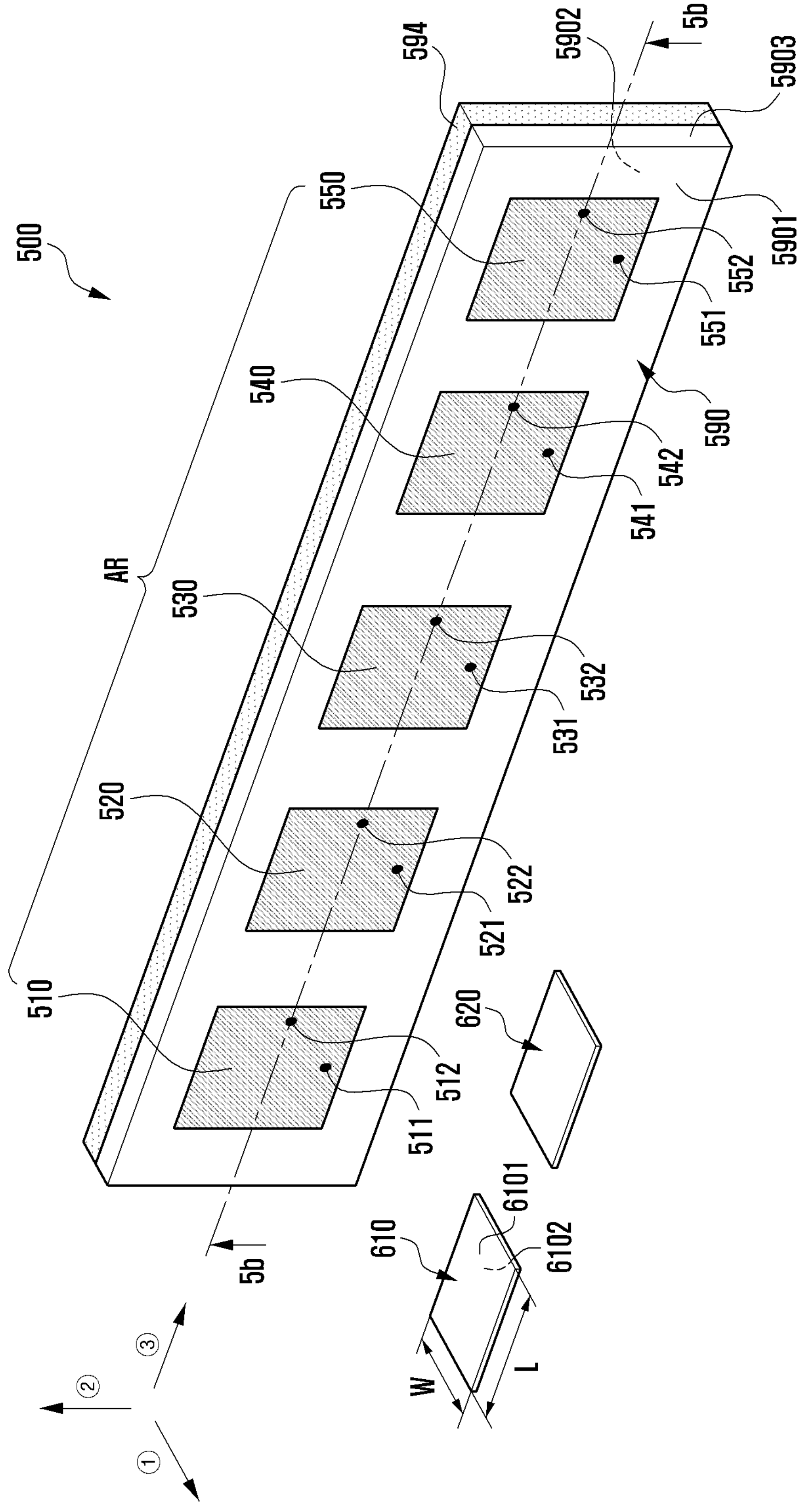
FIG. 5A is a perspective view illustrating an antenna structure according to an embodiment of the disclosure.
Figure 5B:
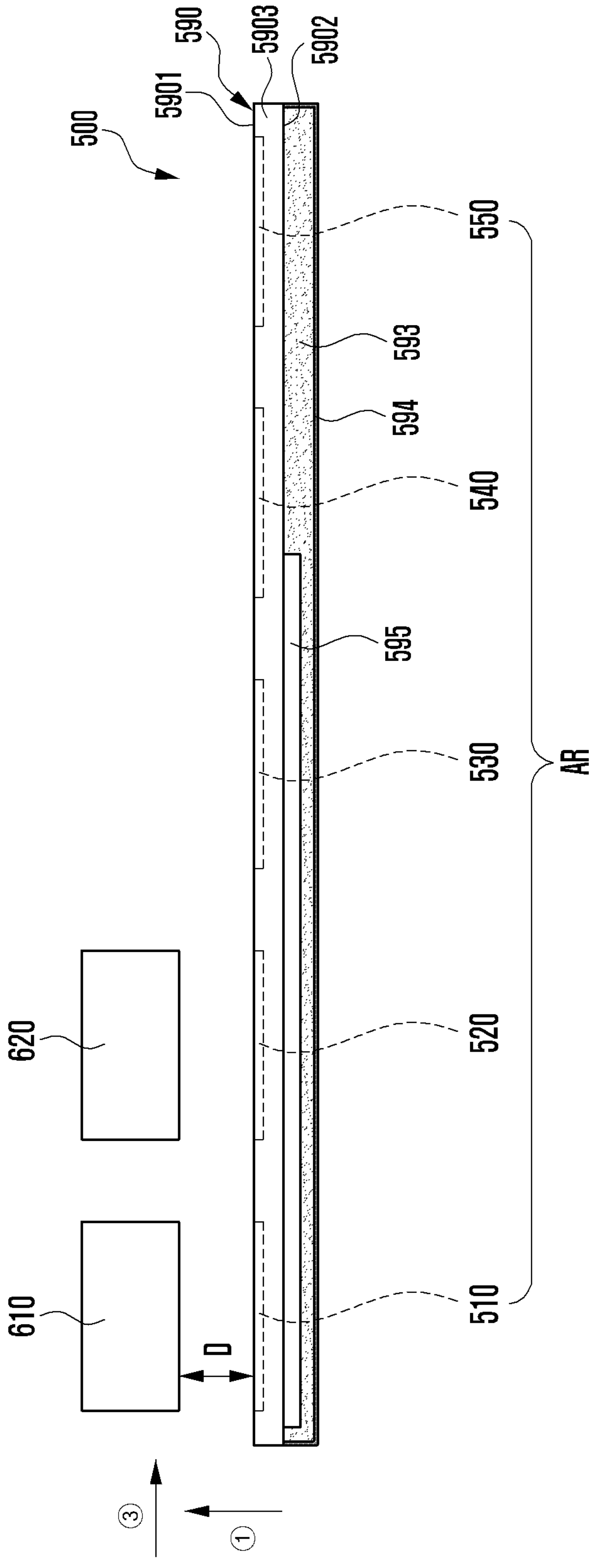
FIG. 5B is a cross-sectional view illustrating an antenna structure taken along line 5*b*-5*b* of FIG. 5A according to an embodiment of the disclosure.

FIG. 5A is a perspective view illustrating an antenna structure according to an embodiment of the disclosure. FIG. 5B is a cross-sectional view illustrating an antenna structure taken along line 5*b*-5*b* of FIG. 5A according to an embodiment of the disclosure.

An antenna structure 500 of FIGS. 5A and 5B may be at least partially similar to the third antenna module 246 of FIG. 2 or may further include other components of the antenna structure.

Referring to FIGS. 5A and 5B, the antenna structure 500 (e.g., antenna module) may include an array antenna AR including a plurality of conductive patches 510, 520, 530, 540 and 550 as an antenna element. According to an embodiment, the plurality of conductive patches 510, 520, 530, 540, and 550 may include a first conductive patch 510, a second conductive patch 520, a third conductive patch 530, a fourth conductive patch 540, and a fifth conductive patch 550 disposed at specified intervals on a substrate 590 (e.g., printed circuit board). According to an embodiment, the substrate 590 may include a first substrate surface 5901 facing in a first direction (direction ①), a second substrate surface 5902 facing in a direction opposite to that of the first substrate surface 5901, and a substrate side surface 5903 enclosing a space between the first substrate surface 5901 and the second substrate surface 5902. According to an embodiment, the plurality of conductive patches 510, 520, 530, 540, and 550 may be configured to be exposed at the first substrate surface 5901 or to be inserted into the substrate 590, and to form a beam pattern in a first direction (direction ①) in which the first substrate surface 5901 faces. According to an embodiment, the antenna structure 500 may be disposed in an internal space (e.g., an internal space 7001 of FIG. 7B) of the electronic device (e.g., an electronic device 700 of FIG. 7B) so that at least a portion of the substrate side surface 5903 of the substrate 590 corresponds to at least a portion (e.g., a module mounting portion 7201 of FIG. 7B) of the housing.

According to various embodiments, the antenna structure 500 may include a wireless communication circuit 595 disposed at the second substrate surface 5902 of the substrate 590. According to an embodiment, the plurality of conductive patches 510, 520, 530, 540, and 550 may be electrically connected to the wireless communication circuit 595 through a wiring structure (not illustrated) of the substrate. According to an embodiment, the wireless communication circuit 595 may be configured to transmit and/or receive a radio frequency in a range of about 3 GHz to about 100 GHz through an array antenna AR. In some embodiments, the wireless communication circuit 595 may be disposed at a position spaced apart from the substrate 590 in an internal space (e.g., the internal space 7001 of FIG. 7B) of the electronic device (e.g., the electronic device 700 of FIG. 7B) and be electrically connected to the substrate 590 through an electrical connection member (e.g., flexible printed circuit board (FPCB)). For example, the wireless communication circuit 595 may be disposed at a main board (e.g., a main board 760 of FIG. 7B) of the electronic device (e.g., the electronic device 700 of FIG. 7B).

According to various embodiments, the antenna structure 500 may operate as a dual polarization antenna configured to form polarizations orthogonal to each other. According to an embodiment, the antenna structure 500 may include a first feeding part 511 disposed at a first point of the first conductive patch 510 and a second feeding part 512 disposed at a second point spaced apart from the first feeding part 511. According to an embodiment, the antenna structure 500 may include a third feeding part 521 disposed at a third point of the second conductive patch 520 and a fourth feeding part 522 disposed at a fourth point spaced apart from the third feeding part 521. According to an embodiment, the antenna structure 500 may include a fifth feeding part 531 disposed at a fifth point of the third conductive patch 530 and a sixth feeding part 532 disposed at a sixth point spaced apart from the fifth feeding part 531. According to an embodiment, the antenna structure 500 may include a seventh feeding part 541 disposed at a seventh point of the fourth conductive patch 540 and an eighth feeding part 542 disposed at an eighth point spaced apart from the seventh feeding part 541. According to an embodiment, the antenna structure 500 may include a ninth feeding part 551 disposed at a ninth point of the fifth conductive patch 550 and a tenth feeding part 552 disposed at a tenth point spaced apart from the ninth feeding part 551. According to an embodiment, the wireless communication circuit 595 may be configured to form first polarization (e.g., vertical polarization) through the first feeding part 511, the third feeding part 521, the fifth feeding part 531, the seventh feeding part 541, and the ninth feeding part 551. According to an embodiment, the wireless communication circuit 595 may be configured to form second polarization (e.g., horizontal polarization) perpendicular to the first polarization through the second feeding part 512, the fourth feeding part 522, the sixth feeding part 532, the eighth feeding part 542, and the tenth feeding part 552. As illustrated, the antenna structure 500 includes five antenna elements disposed at specified intervals, but the disclosure is not limited thereto. For example, the antenna structure 500 may include one antenna element, two antenna elements, three antenna elements, four antenna elements, or six or more antenna elements.

According to various embodiments, the antenna structure 500 may include a protection member 593 disposed at the second substrate surface 5902 of the substrate 590 and disposed to at least partially enclose the wireless communication circuit 595. According to an embodiment, the protection member 593 is a protective layer disposed to enclose the wireless communication circuit 595, and may include a dielectric cured and/or solidified after being applied. According to an embodiment, the protection member 593 may include an epoxy resin. According to an embodiment, the protection member 593 may be disposed to enclose all or a part of the wireless communication circuit 595 at the second substrate surface 5902 of the substrate 590. According to an embodiment, the antenna structure 500 may include a conductive shielding layer 594 laminated in at least a surface of the protection member 593. According to an embodiment, the conductive shielding layer 594 may shield noise (e.g., DC-DC noise or interference frequency component) generated in the antenna structure 500 from being spread to the periphery. According to an embodiment, the conductive shielding layer 594 may include a conductive material applied to a surface of the protection member 593 by a thin film deposition method such as sputtering. According to an embodiment, the conductive shielding layer 594 may be electrically connected to the ground of the substrate 590. In some embodiments, the conductive shielding layer 594 may be disposed to extend to at least a portion of the substrate side surface 5903 including the protection member 593. In some embodiments, the protection member 593 and/or the conductive shielding layer 594 may be replaced with a shield can mounted in the substrate.

According to various embodiments, the electronic device (e.g., the electronic device 700 of FIG. 7B) may include at least one conductive dummy plate 610 and 620 disposed between the housing (e.g., the housing 710 of FIG. 7B) and the antenna structure 500 in the internal space (e.g., the internal space 7001 of FIG. 7B) thereof. According to an embodiment, the at least one conductive dummy plate 610 and 620 may be disposed in a manner in which a conductive part (e.g., a conductive part 721 of FIG. 7B) disposed in at least a portion of the housing is extended. In some embodiments, the at least one conductive dummy plate 610 and 620 may be embedded (e.g., insert injection molded) through a separate injection molding product (e.g., a non-conductive part 722 of FIG. 9A) in the internal space or may be disposed in a manner attached to or formed in the outer surface. In some embodiments, at least one conductive dummy plate 610 and 620 may be disposed together with the array antenna AR in a dielectric structure (e.g., a dielectric structure 590-1 of FIG. 10) (e.g., ceramic material) used as the antenna structure 500.

According to various embodiments, the at least one conductive dummy plate 610 and 620 may include a first conductive dummy plate 610 disposed at a position corresponding to the first conductive patch 510 and a second conductive dummy plate 620 disposed at a position corresponding to the second conductive patch 520. According to an embodiment, the first conductive dummy plate 510 may include a first plate surface 6101 facing in a second direction (direction ②) perpendicular to the first direction (direction ①) and a second plate surface 6102 facing in a direction opposite to that of the first plate surface 6101 as the form of a plate. According to an embodiment, the first conductive dummy plate 610 may be disposed to at least partially overlap the first conductive patch 510 when the housing (e.g., the housing 710 of FIG. 7B) is viewed from the outside. According to an embodiment, the first conductive dummy plate 610 may be disposed so that the first plate surface 6101 faces a direction (direction ②) perpendicular to a surface of the first conductive patch 510. According to an embodiment, the first conductive dummy plate 610 may be disposed so that the first plate surface 6101 faces in a second direction (direction ②) perpendicular to the first direction (direction ①). According to an embodiment, the first conductive dummy plate 610 may have a length L in a third direction (direction ③) perpendicular to the first direction (direction ①) and the second direction (direction ②), and be formed in a rectangular shape having a width W shorter than a length L in the first direction (direction ①). In some embodiments, the first conductive dummy plate 610 may be formed in various shapes at least partially transformed from a rectangular shape. According to an embodiment, the first conductive dummy plate 610 may be disposed to have a length in a direction (e.g., direction ③) perpendicular to a first polarization (e.g., vertical polarization) direction (e.g., direction ②) formed from the first feeding part 511. According to an embodiment, the first conductive dummy plate 610 may have substantially the same length L as that of the first conductive patch 510 when the housing (e.g., the housing 710 of FIG. 7B) is viewed from the outside and be disposed at a position overlapped with a center of the first conductive patch 510. According to an embodiment, the first conductive dummy plate 610 may be disposed to have a designated distance D from the first conductive patch 510. According to an embodiment, the designated distance D may include a range of about 0.01λ to 1λ. According to an embodiment, the designated distance D may include about 0.79 mm. According to an embodiment, a disposition structure of the second conductive dummy plate 620 with respect to the second conductive patch 520 may be substantially the same as that of the first conductive dummy plate 610 with respect to the first conductive patch 510.

According to various embodiments, as illustrated, the at least one conductive dummy plate 610 and 620 includes a first conductive dummy plate 610 and a second conductive dummy plate 620 disposed at positions corresponding to a first conductive patch 510 and a second conductive patch 510, respectively among the five conductive patches 510, 520, 530, 540, and 550, but the disclosure is not limited thereto. For example, the at least one conductive dummy plate may include one conductive dummy plate disposed at a position corresponding to any one of the plurality of conductive patches 510, 520, 530, 540 and 550. In some embodiments, the at least one conductive dummy plate may include a plurality of conductive dummy plates disposed at positions corresponding to all of the plurality of conductive patches 510, 520, 530, 540, and 550, respectively. In some embodiments, the at least one conductive dummy plate may be disposed symmetrically or asymmetrically to the left and the right at positions corresponding to some conductive patches among the plurality of conductive patches 510, 520, 530, 540, and 550. In some embodiments, the at least one conductive dummy plate 610 and 620 may be disposed to have a length in a direction perpendicular to the second polarization direction, for example, a direction (e.g., direction ②) perpendicular to the first plate surface 6101.

According to various embodiments, in a low frequency band (e.g., 28 GHz band) that may affect a radiation performance by the conductive part (e.g., the conductive part 721 of FIG. 7B) of the housing (e.g., the housing 710 of FIG. 7B), in order to prevent performance degradation of vertical polarization, the conductive dummy plates 610 and 620 may have a length in a direction (direction ③) perpendicular to the vertical polarization direction (direction ②) and be disposed so that the first plate surface 6101 faces in a direction (direction ②) perpendicular to the surface of the conductive patches 610 and 620.

According to embodiments of the disclosure, by extending a beam width to a portion of a direction in which the rear plate (e.g., a rear plate 740 of FIG. 7B) of the electronic device (e.g., the electronic device 700 of FIG. 7B) faces and a direction in which the front plate (e.g., a front plate 730 of FIG. 7B) faces by enabling an image source (e.g., image current) of a vertical polarization source to be generated through a disposition structure of the conductive dummy plates 610 and 620, radiation performance degradation of the antenna structure 500 may be reduced.

Figure 6:
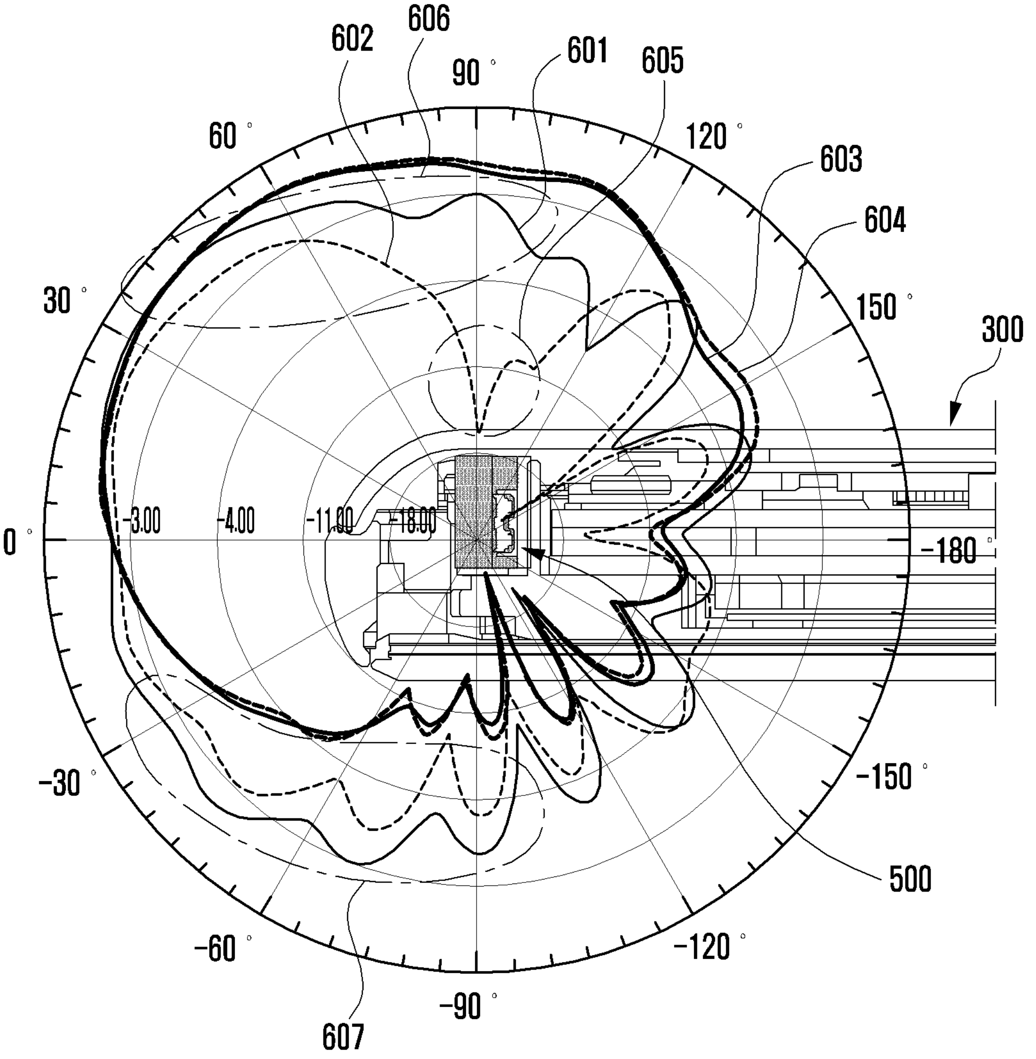
FIG. 6 is a diagram illustrating a radiation pattern of an antenna structure according to presence or absence of a conductive dummy plate according to an embodiment of the disclosure.

FIG. 6 is a diagram illustrating a radiation pattern of an antenna structure according to presence or absence of a conductive dummy plate according to an embodiment of the disclosure.

Referring to FIG. 6, in the antenna structure 500 operating in a 28 GHz band of FIG. 5A, in a case (pattern 603) in which the conductive dummy plates 610 and 620 are applied, it can be seen that a radiation performance of horizontal polarization (H-polarization) is similar to that of a case (pattern 604) in which the conductive dummy plates 610 and 620 are not applied, whereas in a case (pattern 601) in which the conductive dummy plates 610 and 620 are applied, it can be seen that a radiation performance of vertical polarization (V-polarization) is improved further than that of a case (pattern 602) in which the conductive dummy plates 610 and 620 are not applied. For example, in vertical polarization, when the conductive dummy plates 610 and 620 are applied, it can be seen that in a radiation performance of the antenna structure 500, there has been improved a null point existing in an elevation 90 degree area (area 605) of a case in which the conductive dummy plates 610 and 620 are not applied and that a radiation performance has been improved by extending a beam width in an upper area (area 606) and a lower area (area 607) of the electronic device.

Numerically, referring to Table 1, the antenna structure 500 operating in a low frequency band (n261 band) exhibits a gain of 6.5 dB before applying the conductive dummy plates 610 and 620 in a 50% section of a cumulative distribution function (CDF), but after the conductive dummy plates 610 and 620 are applied, the antenna structure 500 exhibits a gain of 6.9 dB; thus, it can be seen that a gain of 0.4 dB is substantially improved. Further, the antenna structure 500 operating in a high frequency band (n260 band) exhibits a gain of 7.0 dB before applying the conductive dummy plates 610 and 620 in a 50% section of the CDF, but after the conductive dummy plates 610 and 620 are applied, the antenna structure 500 exhibits a gain of 7.1 dB; thus, it can be seen that a gain of 0.1 dB is substantially improved.

TABLE 1

| | Frequency | | | |
|---|---|---|---|---|
| | n261(28 GHz) | | n260(39 GHz) | |
| Gain CDF | CDF 50% | peak | CDF 50% | peak |
| Before application | 6.5 | 11.5 | 7.0 | 12.4 |
| After application | 6.9 | 11.5 | 7.1 | 12.5 |
| Delta(Δ) | 0.4 | 0.0 | 0.1 | 0.1 |

Figure 7A:
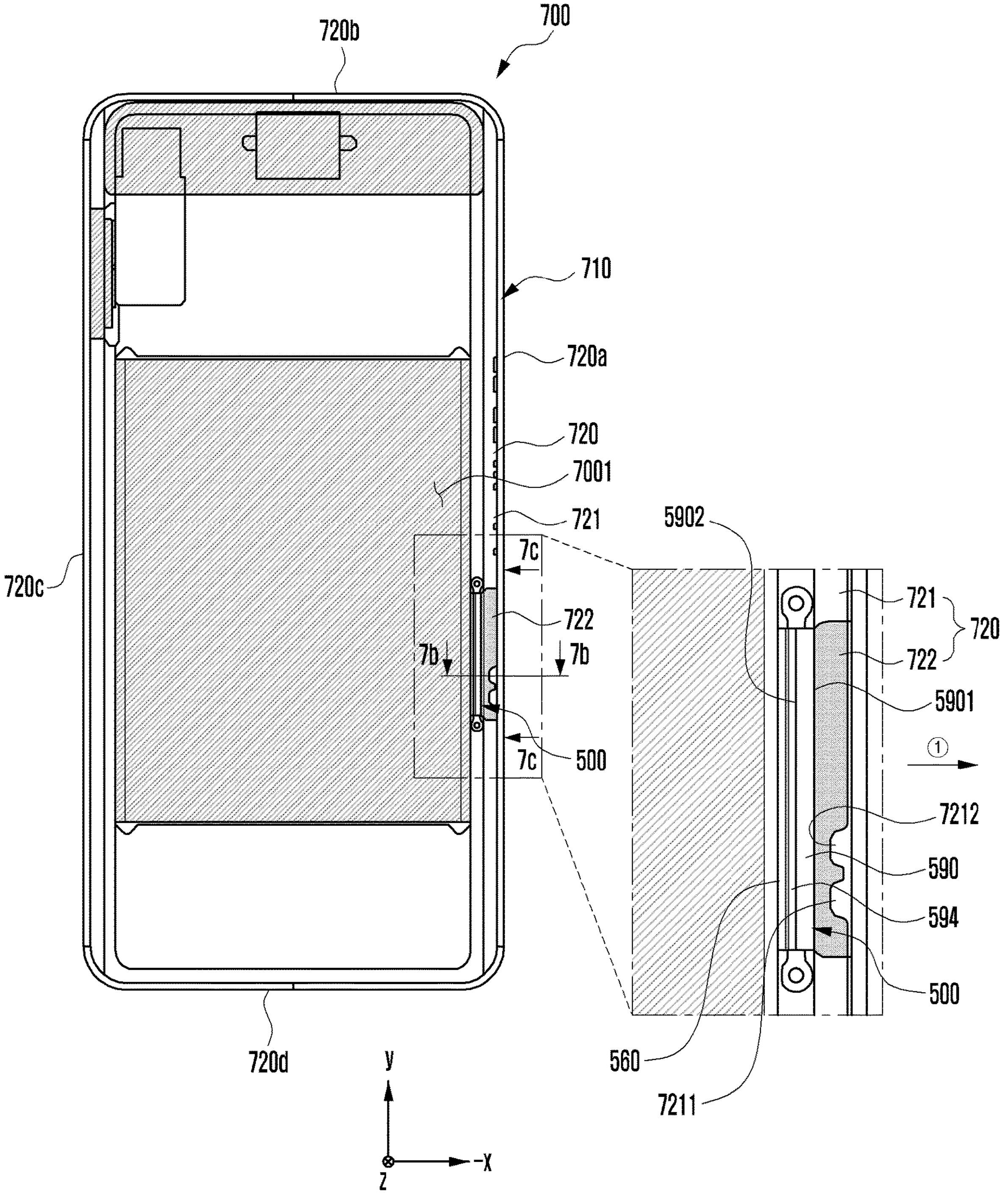
FIG. 7A is a diagram of a partial configuration of an electronic device illustrating a disposition structure of an antenna structure to which a conductive dummy plate is applied according to an embodiment of the disclosure.
Figure 7B:
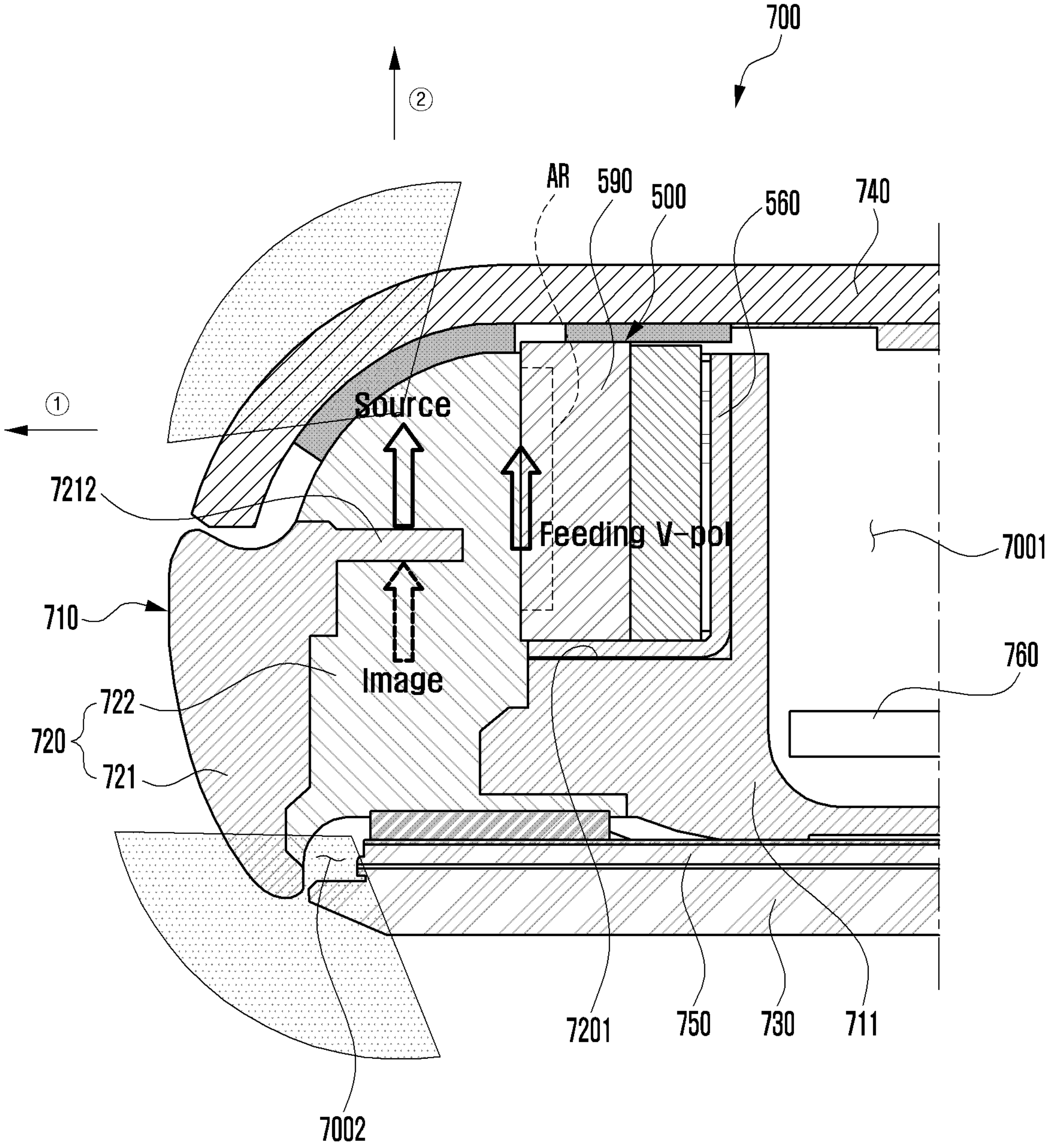
FIG. 7B is a partial cross-sectional view illustrating an electronic device taken along line 7*b*-7*b* of FIG. 7A according to an embodiment of the disclosure.

FIG. 7A is a diagram of a partial configuration of an electronic device illustrating a disposition structure of an antenna structure to which a conductive dummy plate is applied according to an embodiment of the disclosure. FIG. 7B is a partial cross-sectional view illustrating an electronic device taken along line 7*b*-7*b* of FIG. 7A according to an embodiment of the disclosure.

The electronic device 700 of FIGS. 7A and 7B may be at least partially similar to the electronic device 101 of FIG. 1 or the mobile electronic device 300 of FIGS. 3A to 3C, or may further include other components of the electronic device.

Referring to FIGS. 7A and 7B, the electronic device 700 may include a housing 710 (e.g., housing 310 of FIG. 3A) including a front plate 730 (e.g., the front plate 302 of FIG. 3A) facing in a specified direction (e.g., z-axis direction), a rear plate 740 (e.g., the rear plate 311 of FIG. 3B) facing in a direction (e.g., −z axis direction) opposite to that of the front plate 730, and a side member 720 (e.g., the side bezel structure 320 of FIG. 3A) enclosing a space 7001 between the front plate 730 and the rear plate 740. According to an embodiment, the side member 720 may include a first side surface 720*a* having a first length formed in a specified direction (e.g., y-axis direction), a second side surface 720*b* extended in a substantially perpendicular direction (e.g., x-axis direction) to the first side surface 720*a* from the first side surface 720*a* and having a second length shorter than the first length, a third side surface 720*c* extended substantially parallel to the first side surface 720*a* from the second side surface 720*b* and having a first length, and a four side surface 720*d* extended substantially parallel to the second side surface 720*b* from the third side surface 720*c* to the first side surface 720*a* and having a second length. According to an embodiment, the side member 720 may include a conductive part 721 disposed at least partially and a non-conductive part 722 (e.g., polymer part) coupled to the conductive part 721 by insert injection. In some embodiments, the non-conductive part 722 may be replaced with a space or other dielectric material. In some embodiments, the non-conductive part 722 may be structurally coupled to the conductive part 721. According to an embodiment, the side member 720 may include a support member 711 (e.g., the first support member 3111 of FIG. 3C) extended therefrom to at least a portion of the internal space 7001. According to an embodiment, the support member 711 may be extended from the side member 720 to the internal space 7001 or may be formed by structural coupling to the side member 720. According to an embodiment, the support member 711 may be extended from the conductive part 721 in a direction of the internal space 7001. According to an embodiment, the support member 711 may support at least a portion of the antenna structure 500 disposed in the internal space 7001. According to an embodiment, the support member 711 may be disposed to support at least a portion of a display 750. According to an embodiment, the display 750 may be disposed to be visible from the outside through at least a portion of the front plate 730.

According to various embodiments, the antenna structure 500 may be disposed so that an array antenna AR including conductive patches (e.g., the conductive patches 510, 520, 530, 540, and 550 of FIG. 5A) substantially forms a beam pattern in a first direction (direction ①) in which the side member 720 faces. In this case, the beam pattern of the antenna structure 500 may be formed through the non-conductive part 722 of the side member 720. In some embodiments, the antenna structure 500 may be replaced with a plurality of antenna structures having substantially the same structure. According to an embodiment, the plurality of antenna structures may be disposed to form a beam pattern in a direction in which at least one side surface of the first side surface 720*a*, the second side surface 720*b*, the third side surface 720*c*, and/or the fourth side surface 720*d* faces. According to an embodiment, the antenna structure 500 may be disposed so that the first substrate surface 5901 of the substrate 590 corresponds to the side member 720. According to an embodiment, the antenna structure 500 may be disposed so that the first substrate surface 5901 faces the side member 720 through a conductive member 550 disposed in a module mounting portion 7201 provided through at least a portion of the side member 720 and the support member 711 and/or the side member 720. In some embodiments, the antenna structure 500 may be disposed substantially perpendicular to the front plate 730 so that the first substrate surface 5901 of the substrate 590 corresponds to the side member 720, and be configured to form a beam pattern in the first direction (direction ①), a space between the side member 720 and the front plate 730, a direction in which the front plate 730 faces, a space between the side member 720 and the rear plate 740, and/or a direction in which the rear plate 740 faces. According to an embodiment, the electronic device 700 may include a main board 760 disposed in the internal space 7001. Although not illustrated, the antenna structure 500 may be electrically connected to the main board 760 through an electrical connection member (e.g., FPCB connector). According to an embodiment, the electronic device 700 may include a conductive member 560 for supporting at least a portion of the antenna structure 500 and disposed in the module mounting portion 7201 formed through the conductive part 721 of the housing 710.

According to various embodiments, the electronic device 700 may include at least one conductive dummy plate 7211 and 7212 (e.g., the conductive dummy plates 610 and 620 of FIG. 5A) disposed between the housing 710 and the antenna structure 500 in the internal space 7001. According to an embodiment, at least one conductive dummy plate 7211 and 7212 may include a first conductive dummy plate 7211 and a second conductive dummy plate 7212 extended from the conductive part 721 of the housing 710 into the internal space 7001. According to an embodiment, when the side member 720 is viewed from the outside, the first conductive dummy plate 7211 may be disposed at a position at least partially overlapped with the first conductive patch (e.g., the first conductive patch 510 of FIG. 5A) of the antenna structure 500. According to an embodiment, when the side member 720 is viewed from the outside, the second conductive dummy plate 7212 may be disposed at a position at least partially overlapped with the second conductive patch (e.g., the second conductive patch 520 of FIG. 5A) of the antenna structure 500. According to an embodiment, the conductive dummy plates 7211 and 7212 may enable to generate an image source (e.g., image current) of a vertical polarization source through the first feeding part (e.g., the first feeding part 511 of FIG. 5A) of the first conductive patch 510 and the third feeding part (e.g., the third feeding part 521 of FIG. 5A) of the second conductive patch 520 to expand a beam width of the beam pattern, thereby reducing radiation performance degradation of the antenna structure 500. For example, in the antenna structure 500, a beam width of the beam pattern may be expanded in a direction in which the side member 720 faces, a direction in which the rear plate 740 faces, and/or a direction in which the front plate 730 faces in the space 7002 between the display 750 and the side member 720, thereby improving a radiation performance.

Figure 7C:
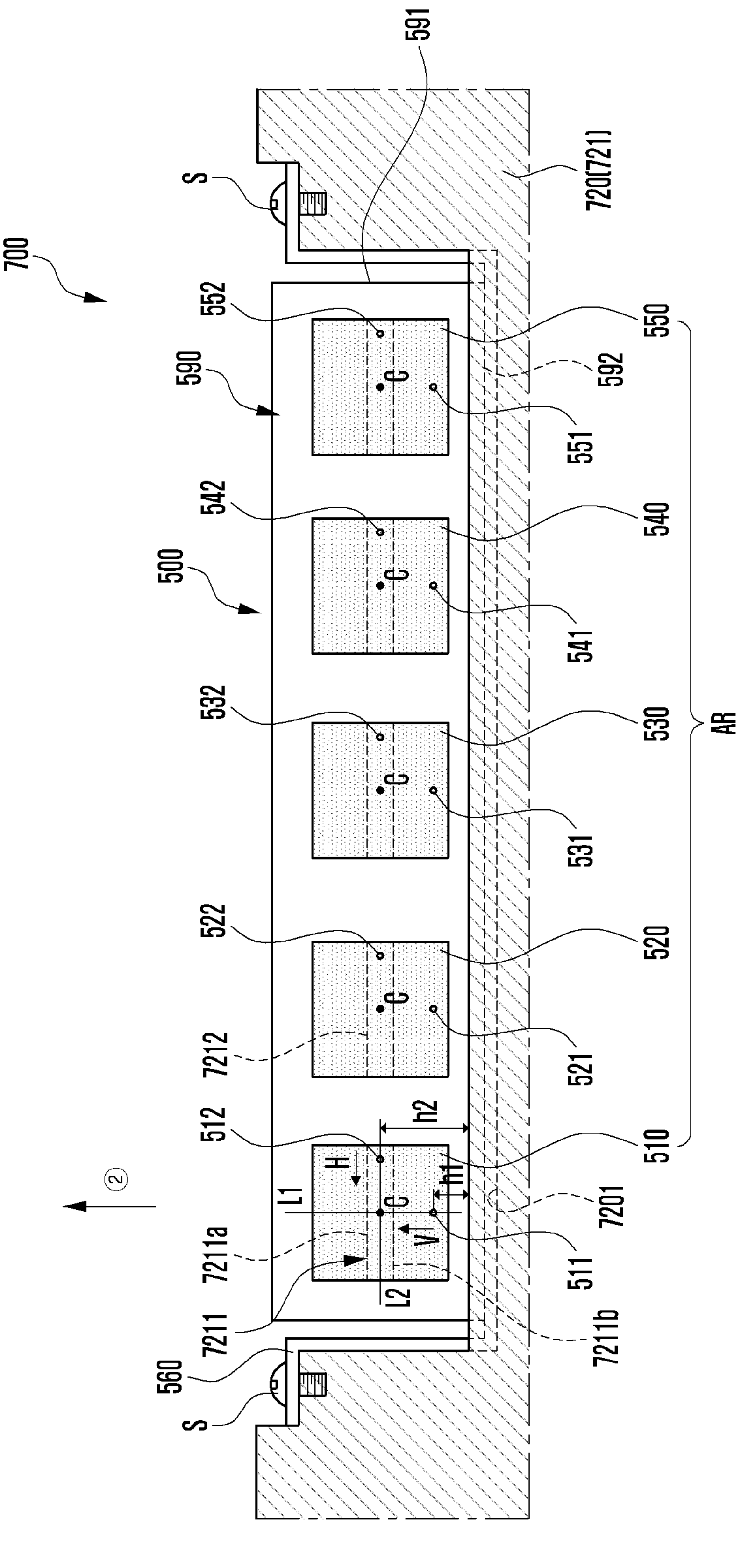
FIG. 7C is a partial cross-sectional view illustrating an electronic device taken along line 7*c*-7*c* of FIG. 7A according to an embodiment of the disclosure.

FIG. 7C is a partial cross-sectional view illustrating an electronic device taken along line 7*c*-7*c* of FIG. 7A according to an embodiment of the disclosure.

Referring to FIG. 7C, the electronic device 700 may include a housing 710 including the conductive part 721 and an antenna structure 500 as an array antenna AR disposed in an internal space of the housing 710. According to an embodiment, the housing 710 may include a side member 720 forming at least a portion of the side surface (e.g., the side surface 310C of FIG. 3A) of the electronic device 700, and receive the antenna structure 500 for forming a beam pattern in a direction in which the side surface faces through at least a portion of the non-conductive part (e.g., the non-conductive part 722 of FIG. 7B) coupled to the conductive part 721. According to an embodiment, the antenna structure 500 may be fixed in a manner in which it is disposed through the housing 710 and a conductive member 560 disposed in the housing 710. In this case, the conductive member 560 may be fixed to at least a portion of the side member 720 through a fastening member such as a screw S.

According to various embodiments, the antenna structure 500 may include a substrate 590 and a first conductive patch 510, a second conductive patch 520, a third conductive patch 530, a fourth conductive patch 540, or a fifth conductive patch 550 as antenna elements disposed at a specified interval in the substrate 590. According to an embodiment, in a case in which the substrate 590 is disposed in an internal space of the housing 710, when the side member 720 is viewed from the outside, at least a portion (e.g., an edge portion of a short side 591 and/or a long side 592 of the substrate 590) of the substrate 590 may be disposed to overlap the conductive part 721. In some embodiments, all of the substrate 590 may be disposed not to overlap the conductive part 721. According to an embodiment, in a case in which the substrate 590 is disposed in the internal space of the housing 710, when the side member 720 is viewed from the outside, the first conductive patch 510, the second conductive patch 520, the third conductive patch 530, the fourth conductive patch 540, or the fifth conductive patch 550 may be disposed at a position that does not overlap the conductive part 721. In some embodiments, the first conductive patch 510, the second conductive patch 520, the third conductive patch 530, the fourth conductive patch 540, or the fifth conductive patch 550 may be disposed at a position at least partially overlapped with the conductive part 721. In this case, the first to tenth feeding parts 511, 512, 521, 522, 531, 532, 541, 542, 551, and 552 to be described later may be disposed at positions that do not overlap the conductive part 721.

According to various embodiments, the antenna structure 500 may include a first feeding part 511 disposed at a first point of the first conductive patch 510 and a second feeding part 512 disposed at a second point spaced apart from the first feeding part 511. According to an embodiment, the wireless communication circuit (e.g., the wireless communication circuit 595 of FIG. 5B) may be electrically connected to the first feeding part 511 and the second feeding part 512 through a wiring structure disposed inside the substrate 590. According to an embodiment, the first feeding part 511 may be disposed on a first imaginary line L1 passing through a center C of the first conductive patch 510. According to an embodiment, the second feeding part 512 may be disposed on the second imaginary line L2 passing through the center C of the first conductive patch 510 and vertically intersecting the first imaginary line L1. According to an embodiment, the antenna structure 500 may include a third feeding part 521 and fourth feeding part 522 disposed at the second conductive patch 520 in substantially the same manner as the disposition structure of the first feeding part 511 and the second feeding part 512 disposed at the first conductive patch 510. According to an embodiment, the antenna structure 500 may include a fifth feeding part 531 and sixth feeding part 532 disposed in the third conductive structure patch 530 in substantially the same manner as the disposition structure of the first feeding part 511 and the second feeding part 512 disposed in the first conductive patch 510. According to an embodiment, the antenna structure 500 may include a seventh feeding part 541 and eighth feeding part 542 disposed in the fourth conductive patch 540 in substantially the same manner as the disposition structure of the first feeding part 511 and the second feeding part 512 disposed in the first conductive patch 510. According to an embodiment, the antenna structure 500 may include a ninth feeding part 551 and tenth feeding part 552 disposed in the fifth conductive patch 550 in substantially the same manner as the disposition structure of the first feeding part 511 and the second feeding part 512 disposed in the first conductive patch 510. According to an embodiment, the first feeding part 511 and the second feeding part 512 may be disposed so that a first distance h1 and a second distance h2 to the long side 592 of the substrate 590 are different from each other. For example, the third feeding part 521 and the fourth feeding part 522, the fifth feeding part 531 and the sixth feeding part 532, the seventh feeding part 541 and the eighth feeding part 542, or the ninth feeding part 551 and the tenth feeding part 552 may also be disposed in substantially the same manner. Accordingly, the antenna structure 500 may operate as an array antenna AR through the first conductive patch 510, the second conductive patch 520, the third conductive patch 530, the fourth conductive patch 540, or the fifth conductive patch 550. For example, the wireless communication circuit (e.g., the wireless communication circuit 595 of FIG. 5B) may be configured to form first polarization (e.g., vertical polarization V) operating in a direction parallel to the short side 591 of the substrate through the first feeding part 511, the third feeding part 521, the fifth feeding part 531, the seventh feeding part 541, and the ninth feeding part 551, and be configured to be perpendicular to first polarization through the second feeding part 512, the fourth feeding part 522, the sixth feeding part 532, the eighth feeding part 542, or the tenth feeding part 552 and to form second polarization (e.g., horizontal polarization H) in a direction parallel to the long side 592 of the substrate. According to an embodiment, the wireless communication circuit (e.g., the wireless communication circuit 595 of FIG. 5B) may be configured to transmit and/or receive a wireless signal in a frequency band in a range from about 3 GHz to about 300 GHz through the array antenna (AR).

According to various embodiments, the electronic device 700 may include a first conductive dummy plate 7211 (e.g., the first conductive dummy plate 610 of FIG. 5A) disposed in an internal space and disposed at a position corresponding to the first conductive patch 510. According to an embodiment, the first conductive dummy plate 7211 may include a first plate surface 7211*a* (e.g., the first plate surface 6101 of FIG. 5A) and a second plate surface 7211*b* (e.g., the second plate surface 6102 of FIG. 5A) facing in a direction opposite to that of the first plate surface 7211*a*. According to an embodiment, the first conductive dummy plate 7211 may be disposed so that the first plate surface 7211*a* faces in a direction (direction ②) perpendicular to a direction (e.g., the direction ① of FIG. 5A) in which a surface of the first conductive patch 510 faces. According to an embodiment, the electronic device 700 may include a second conductive dummy plate 7212 disposed at a position corresponding to the second conductive patch 520 in substantially the same manner as the disposition structure of the first conductive dummy plate 7211.

By inducing an image source (e.g., image current) of first polarization (e.g., vertical polarization) to be generated through the first conductive dummy plate 7211 and the second conductive dummy plate 7212 disposed near the first conductive patch 510 and the second conductive patch 520, respectively, the antenna structure 500 according to an embodiment of the disclosure may receive help in expanding a beam width of a beam pattern and reducing radiation performance degradation.

Figure 8A:
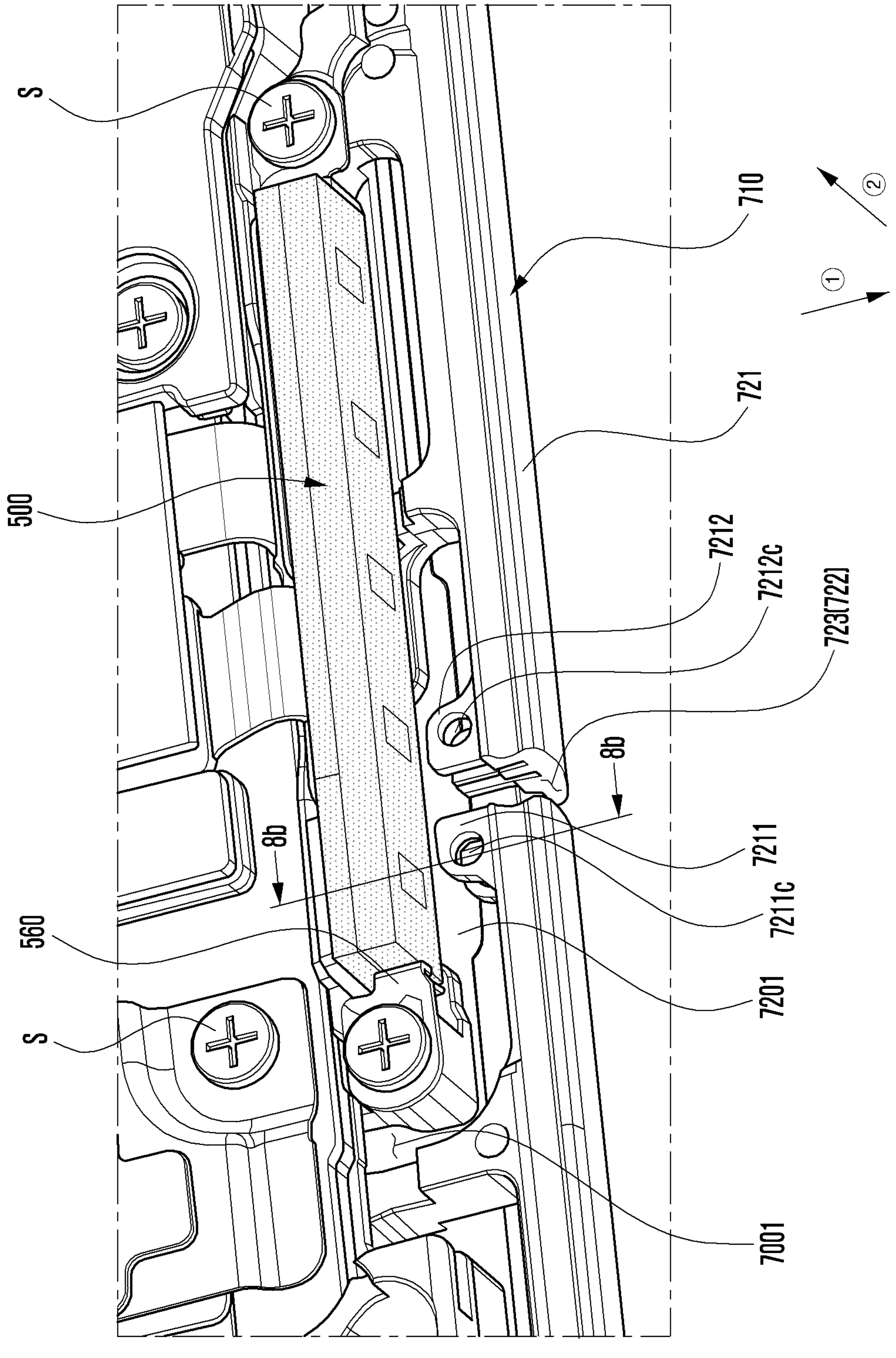
FIG. 8A is a partial perspective view illustrating an electronic device including a conductive dummy plate according to an embodiment of the disclosure.
Figure 8B:
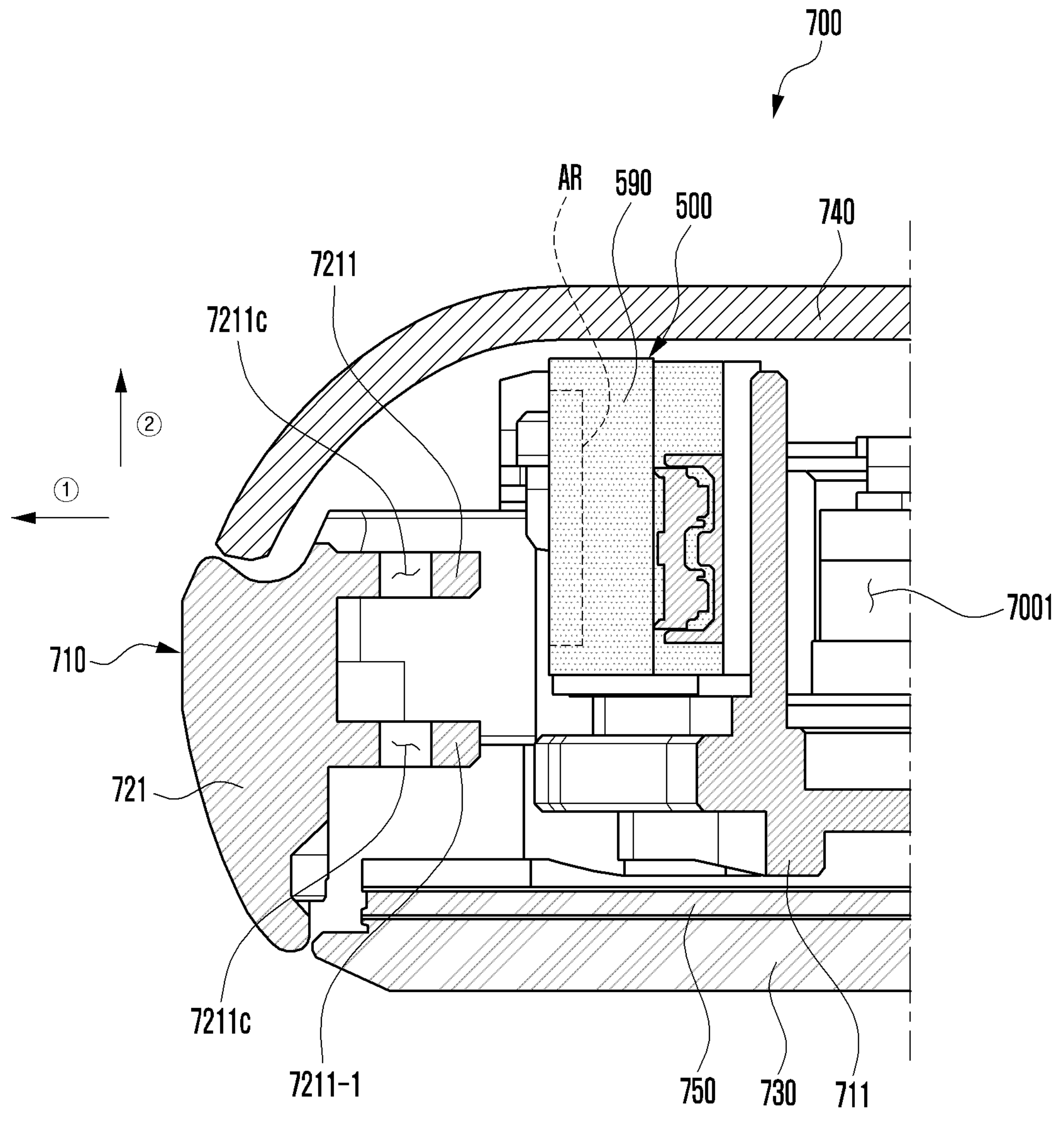
FIG. 8B is a partial cross-sectional view illustrating an electronic device taken along line 8*b*-8*b* of FIG. 8A according to an embodiment of the disclosure.

FIG. 8A is a partial perspective view illustrating an electronic device including a conductive dummy plate according to an embodiment of the disclosure. FIG. 8B is a partial cross-sectional view illustrating an electronic device taken along line 8*b*-8*b* of FIG. 8A according to an embodiment of the disclosure.

In describing the electronic device 700 of FIGS. 8A and 8B, the same reference numerals are assigned to substantially the same components as those of the electronic device 700 of FIGS. 7A and 7B, and a detailed description thereof may be omitted.

Referring to FIGS. 8A and 8B, when the side member 720 is viewed from the outside, the electronic device 700 may include at least one segmented part 723 disposed at a position at least partially overlapped with the antenna structure 500. According to an embodiment, at least a portion of the conductive part 721 may be segmented through the segmented part 723 to be used as an antenna operating in a designated frequency band (e.g., legacy band). According to an embodiment, the at least one segmented part 723 may be filled through the non-conductive part 722 coupled to the conductive part 721.

According to various embodiments, the electronic device 700 may include at least one conductive dummy plate 7211 and 7212 extended from the conductive part 721 to the internal space 7001 near the at least one segmented part 723. For example, the at least one conductive dummy plate 7211 and 7212 may include an injection hole 7211*c* and/or 7212*c* for reinforcing rigidity of a peripheral area weakened by forming the segmented part 723. According to an embodiment, at least one conductive dummy plate 7211 and 7212 may be disposed at a position overlapped with the array antenna AR formed in the antenna structure 500, thereby helping to improve a radiation performance of the antenna structure 500, as described above. In some embodiments, the electronic device 700 expands a coupling area with an injection-molded product (e.g., the non-conductive portion 722) through an additional conductive dummy plate 7211-1 additionally disposed near the at least one conductive dummy plate 7211 and 7212 formed from the housing 710, thereby helping to reinforce rigidity of the electronic device 700.

Figure 9A:
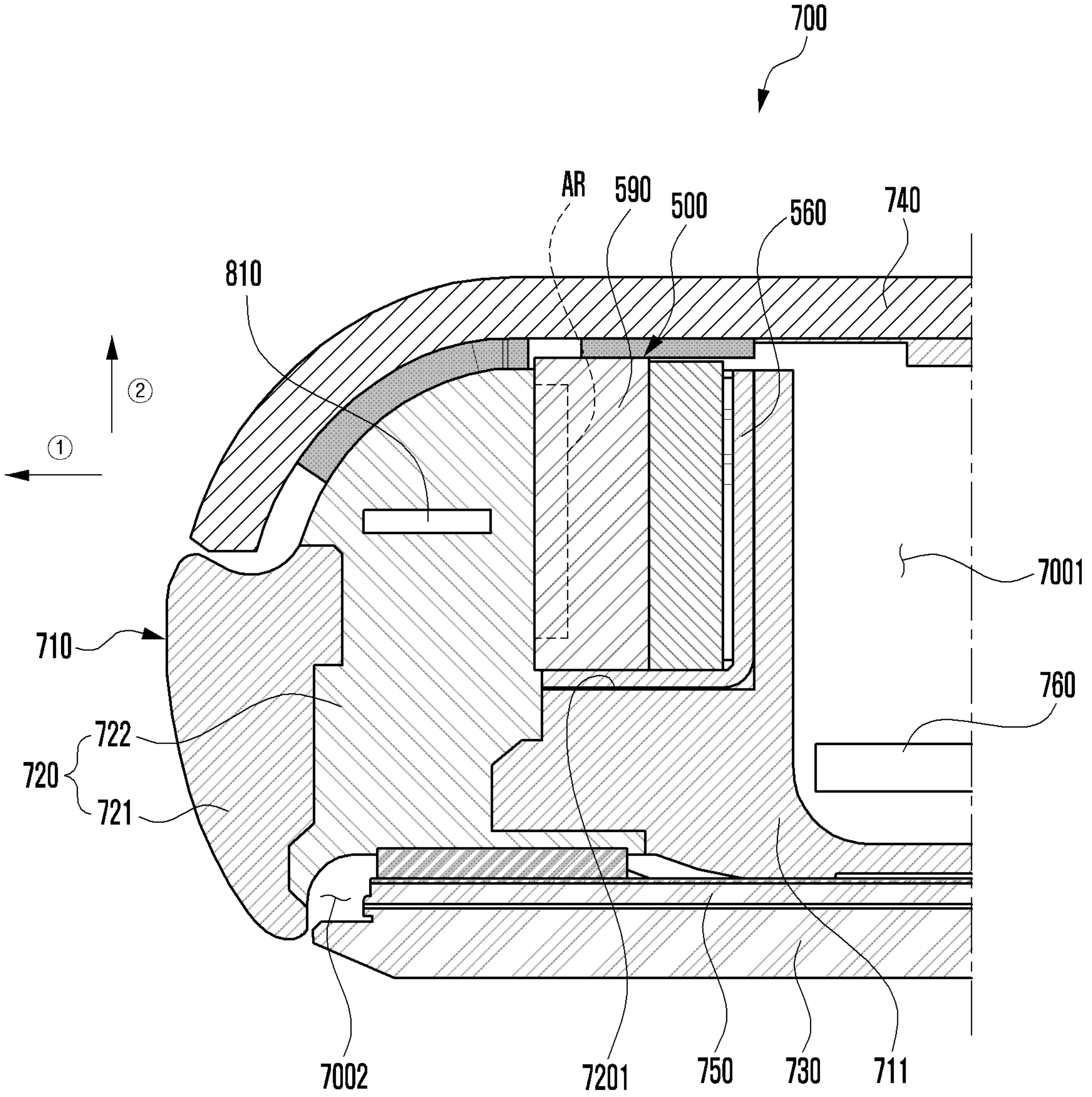
FIGS. 9A and 9B are partial cross-sectional views illustrating an electronic device including a conductive dummy plate according to various embodiments of the disclosure.
Figure 9B:
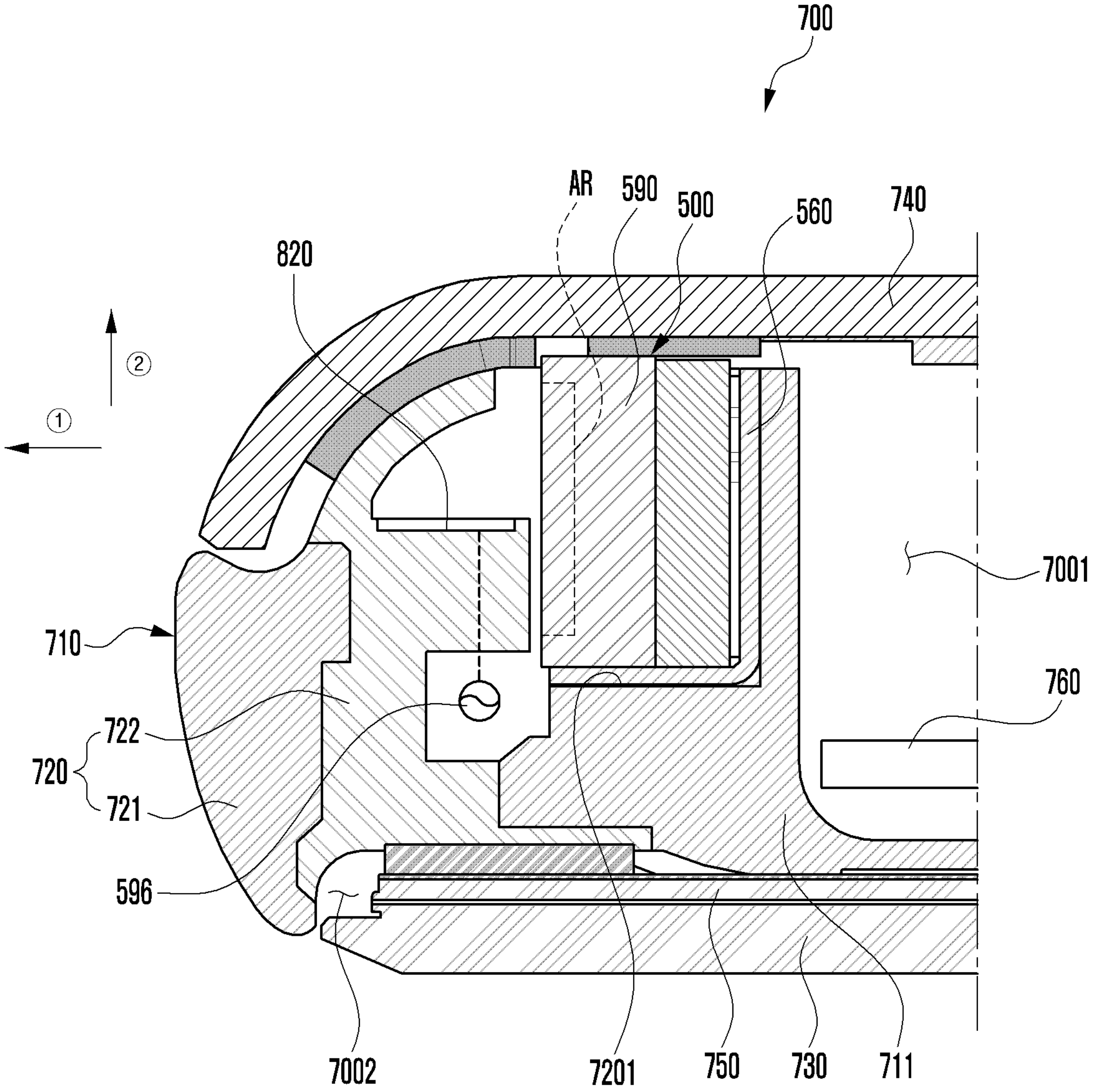

FIGS. 9A and 9B are partial cross-sectional views illustrating an electronic device including a conductive dummy plate according to various embodiments of the disclosure.

In describing the electronic device 700 of FIGS. 9A and 9B, the same reference numerals are assigned to substantially the same components as those of the electronic device 700 of FIGS. 7A and 7B, and a detailed description thereof may be omitted.

Referring to FIG. 9A, at least one conductive dummy plate 810 (e.g., the conductive dummy plates 610 and 620 of FIG. 5A) may be disposed at a position spaced apart from the conductive part 721 of the side member 720 the housing 710 in the internal space 7001 of the electronic device 700. In this case, the at least one conductive dummy plate 810 is disposed without considering a cover amount of the antenna structure 500 by the conductive part 721 of the side member 720, so that when the side member 720 is viewed from the outside, it may be advantageous for a disposition design disposed at a position overlapped with the center of at least one antenna element (e.g., the first conductive patch 510 or the second conductive patch 520 of FIG. 5A) of the antenna structure 500. According to an embodiment, the at least one conductive dummy plate 810 may be disposed in a manner in which it is injected into the non-conductive part 722 extended from the side member 720 to the internal space 7001 of the electronic device 700. In some embodiments, the at least one conductive dummy plate 810 may be disposed in a separate injection-molded product disposed in the internal space 7001 of the electronic device 700. In some embodiments, the at least one conductive dummy plate 810 may be disposed through an injection-molded product structurally coupled to the non-conductive part 722.

Referring to FIG. 9B, the at least one conductive dummy plate 820 (e.g., the conductive dummy plates 610 and 620 of FIG. 5A) may be disposed in the non-conductive part 722 disposed in the internal space 7001 of the electronic device 700. In this case, while the at least one conductive dummy plate 820 is used as a conductor for improving a radiation performance of the antenna structure 500, the at least one conductive dummy plate 820 is electrically connected to another wireless communication circuit 596 is disposed in the internal space 7001 (e.g., disposed in the main board 760) of the electronic device 700; thus, the at least one conductive dummy plate 820 may be used as an antenna operating in a designated frequency band (e.g., legacy band). For example, the at least one conductive dummy plate 820 may be disposed in a manner in which it is embedded in the non-conductive part 722, is formed at an outer surface thereof, or is attached to the non-conductive part 722. According to an embodiment, the at least one conductive dummy plate 820 may include at least one of a laser direct structuring (LDS) pattern formed in the non-conductive part 722 (e.g., injection-molded product or antenna carrier), a flexible printed circuit board (FPCB) including a conductive pattern attached to the non-conductive part 722, a conductive plate, or conductive paint.

When at least one conductive dummy plate (e.g., the conductive dummy plates 610 and 620 of FIG. 5A or the conductive dummy plates 7211 and 7212 of FIG. 7A) according to various embodiments of the disclosure is extended from the conductive part 721, the at least one conductive dummy plate may be electrically connected to the ground disposed at the main board 760 of the electronic device 700. In some embodiments, when the at least one conductive dummy plate (e.g., the conductive dummy plate 810 of FIG. 9A or the conductive dummy plate 820 of FIG. 9B) is disposed at a position spaced apart from the conductive part 721, the at least one conductive dummy plate may be electrically connected to the ground disposed at the main board 760 of the electronic device 700 through a separate electrical connection structure.

Figure 10:
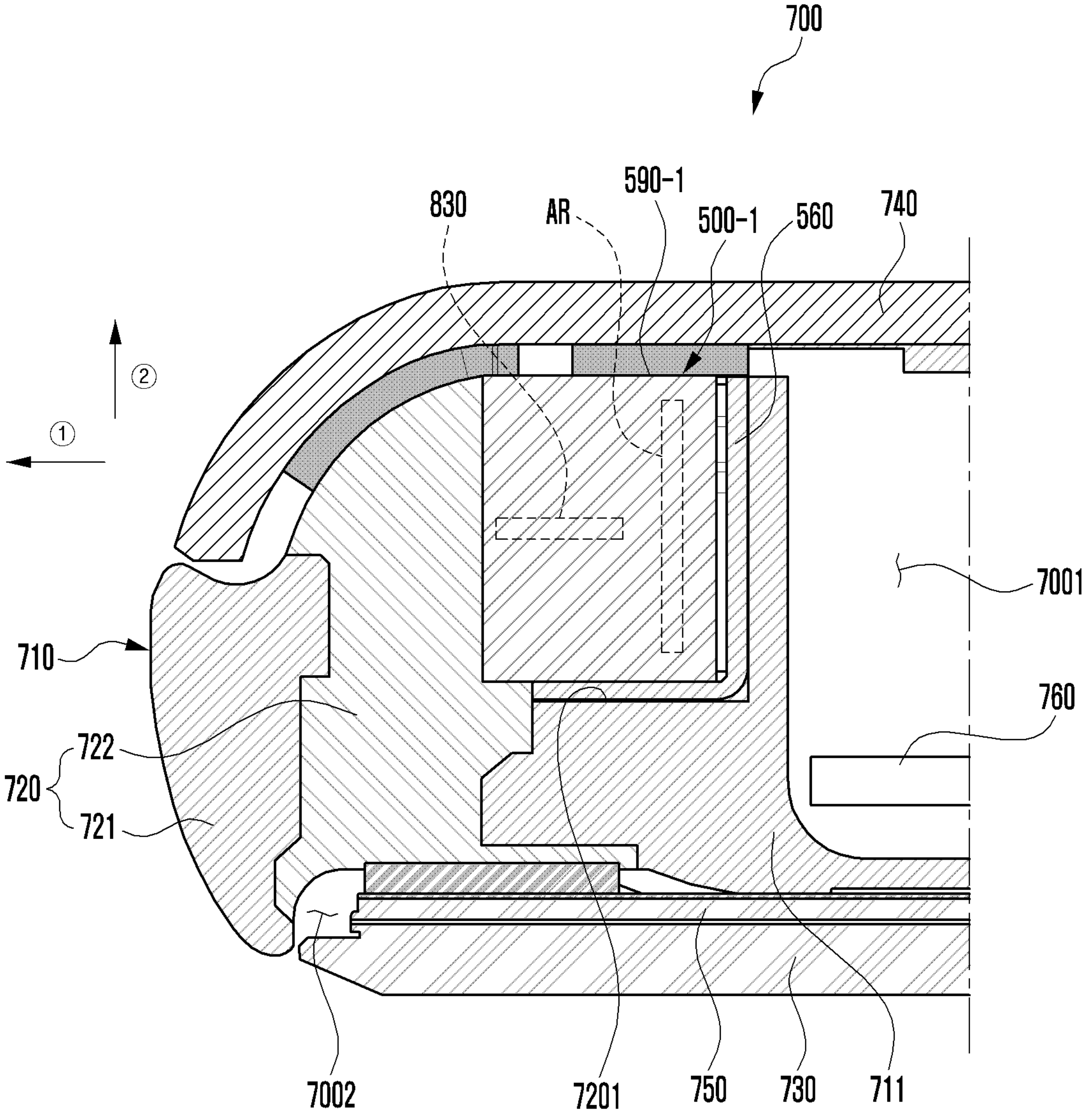
FIG. 10 is a partial cross-sectional view illustrating an electronic device in which an antenna structure including a conductive dummy plate is disposed according to an embodiment of the disclosure.

FIG. 10 is a partial cross-sectional view illustrating an electronic device in which an antenna structure including a conductive dummy plate is disposed according to an embodiment of the disclosure.

In describing the electronic device 700 of FIG. 10, the same reference numerals are assigned to substantially the same components as those of the electronic device 700 of FIGS. 7A and 7B, and a detailed description thereof may be omitted.

Referring to FIG. 10, the electronic device may include an antenna structure 500-1 including a dielectric structure 590-1 (e.g., a substrate made of a ceramic material), an array antenna AR including at least one antenna element (e.g., the conductive patches 510, 520, 530, 540, and 550 of FIG. 1) disposed in the dielectric structure 590-1, and at least one conductive dummy plate 830 (e.g., the conductive dummy plates 610 and 620 of FIG. 5A) spaced apart at a specified interval from the array antenna AR in the dielectric structure 590-1. At least one conductive dummy plate 830 may be provided as a part of the antenna structure 500-1, thereby helping to improve assembly. In this case, the at least one conductive dummy plate 830 may be formed through a conductive pattern or a plurality of conductive vias disposed in the dielectric structure 590-1.

Figure 11A:
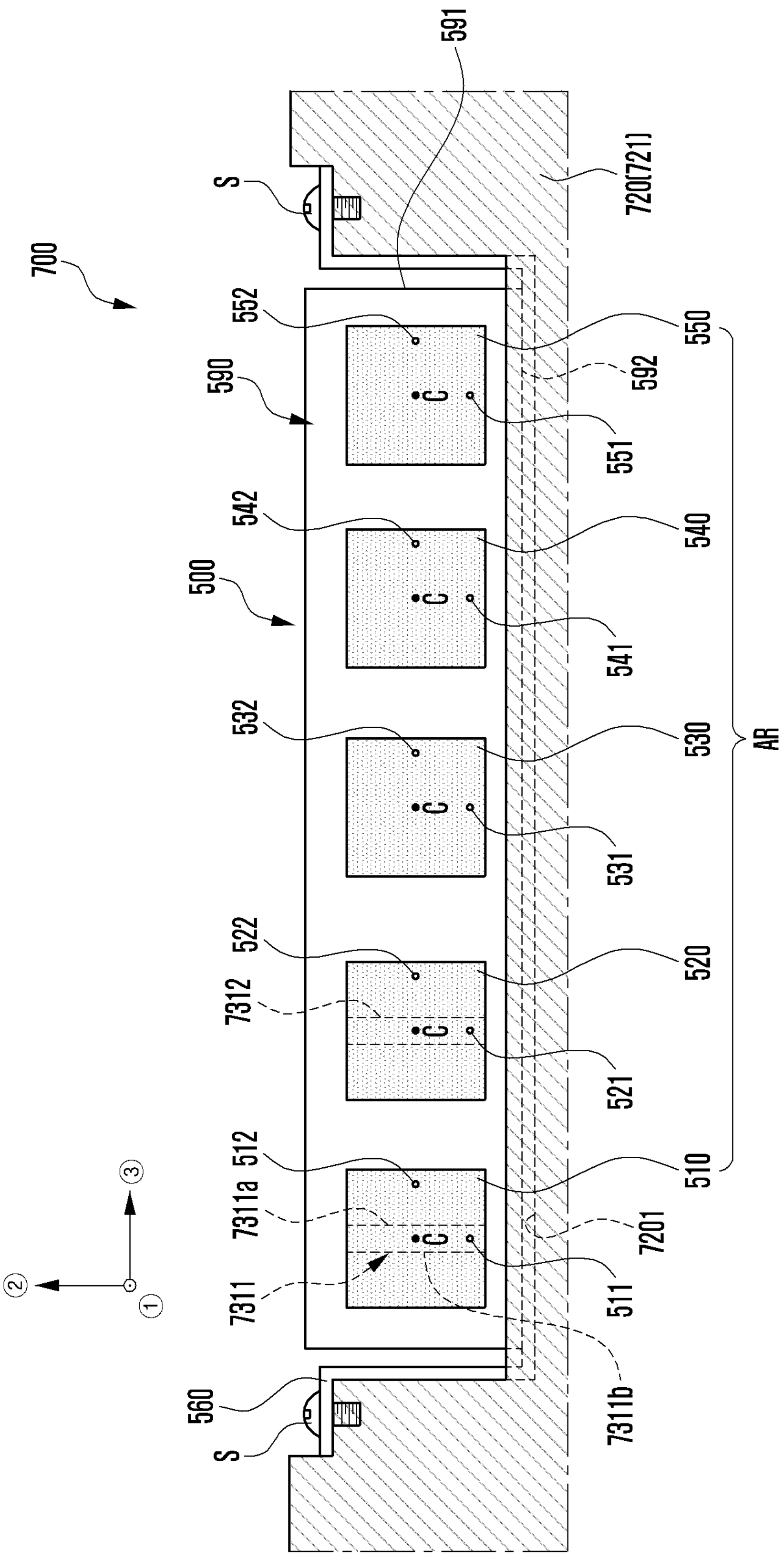
FIGS. 11A and 11B are diagrams illustrating various disposition structures of a conductive dummy plate corresponding to an antenna structure according to various embodiments of the disclosure.
Figure 11B:
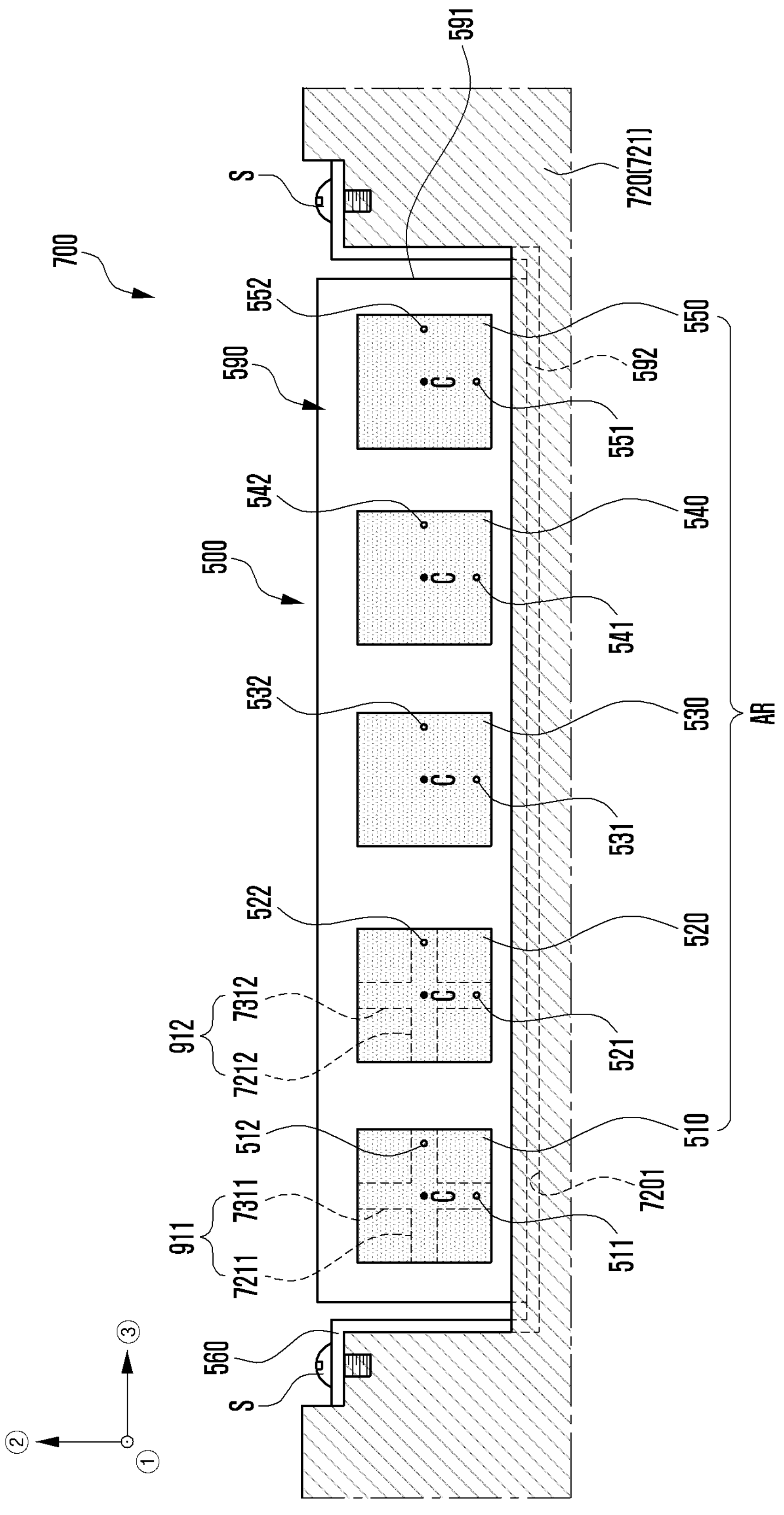

FIGS. 11A and 11B are diagrams illustrating various disposition structures of a conductive dummy plate corresponding to an antenna structure according to various embodiments of the disclosure.

In describing the electronic device 700 of FIGS. 11A and 11B, the same reference numerals are assigned to substantially the same components as those of the electronic device 700 of FIG. 7C, and a detailed description thereof may be omitted.

Referring to FIG. 11A, at least one conductive dummy plate 7311 and 7312 may include a first conductive dummy plate 7311 disposed at a position corresponding to the first conductive patch 510 and a second conductive dummy plate 7312 disposed at a position corresponding to the second conductive patch 520. According to an embodiment, the first conductive dummy plate 7311 may include a first plate surface 7311*a* and a second plate surface 7311*b* facing in a direction opposite to that of the first plate surface 7311*a*. According to an embodiment, the first conductive dummy plate 7311 may be disposed so that the first plate surface 7311*a* faces a third direction (direction ③) perpendicular to a first direction (direction ①) (e.g., beam pattern forming direction) in which a surface of the first conductive patch 510 faces, and the first conductive dummy plate 7311 may be disposed to have a length in a second direction (direction ②) perpendicular to second polarization (e.g., horizontal polarization) formed by the second feeding part 512. According to an embodiment, the second conductive dummy plate 7312 may also have substantially the same disposition structure as that of the first conductive dummy plate 7311 in an area corresponding to the second conductive patch 520. In this case, the antenna structure 500 may receive help in improving a radiation performance of horizontal polarization through the first conductive dummy plate 7311 and the second conductive dummy plate 7312.

Referring to FIG. 11B, the electronic device 700 may include a first cross type dummy plate 911 disposed to correspond to the first conductive patch 510 of the antenna structure 500 and a second cross type dummy plate 912 disposed to correspond to the second conductive patch 520 in the internal space 7001. According to an embodiment, the first cross type dummy plate 911 may include a first sub-plate 7211 having a length in a direction (direction ③) perpendicular to first polarization (e.g., vertical polarization) formed by the first feeding part 511 and a second sub-plate 7311 vertically intersecting the first sub-plate 7211 and having a length in a direction (direction ②) perpendicular to second polarization (e.g., horizontal polarization) formed by the second feeding part 512. According to an embodiment, the first sub-plate 7211 and the second sub-plate 7311 may be integrally formed. According to an embodiment, the second cross type dummy plate 912 may also include a third sub-plate 7212 and fourth sub-plate 7312 formed in substantially the same manner as that of the first cross type dummy plate 911. In this case, the antenna structure 500 may receive help in improving a radiation performance of vertical polarization and horizontal polarization through the first cross type dummy plate 911 and the second cross type dummy plate 912.

Figure 12A:
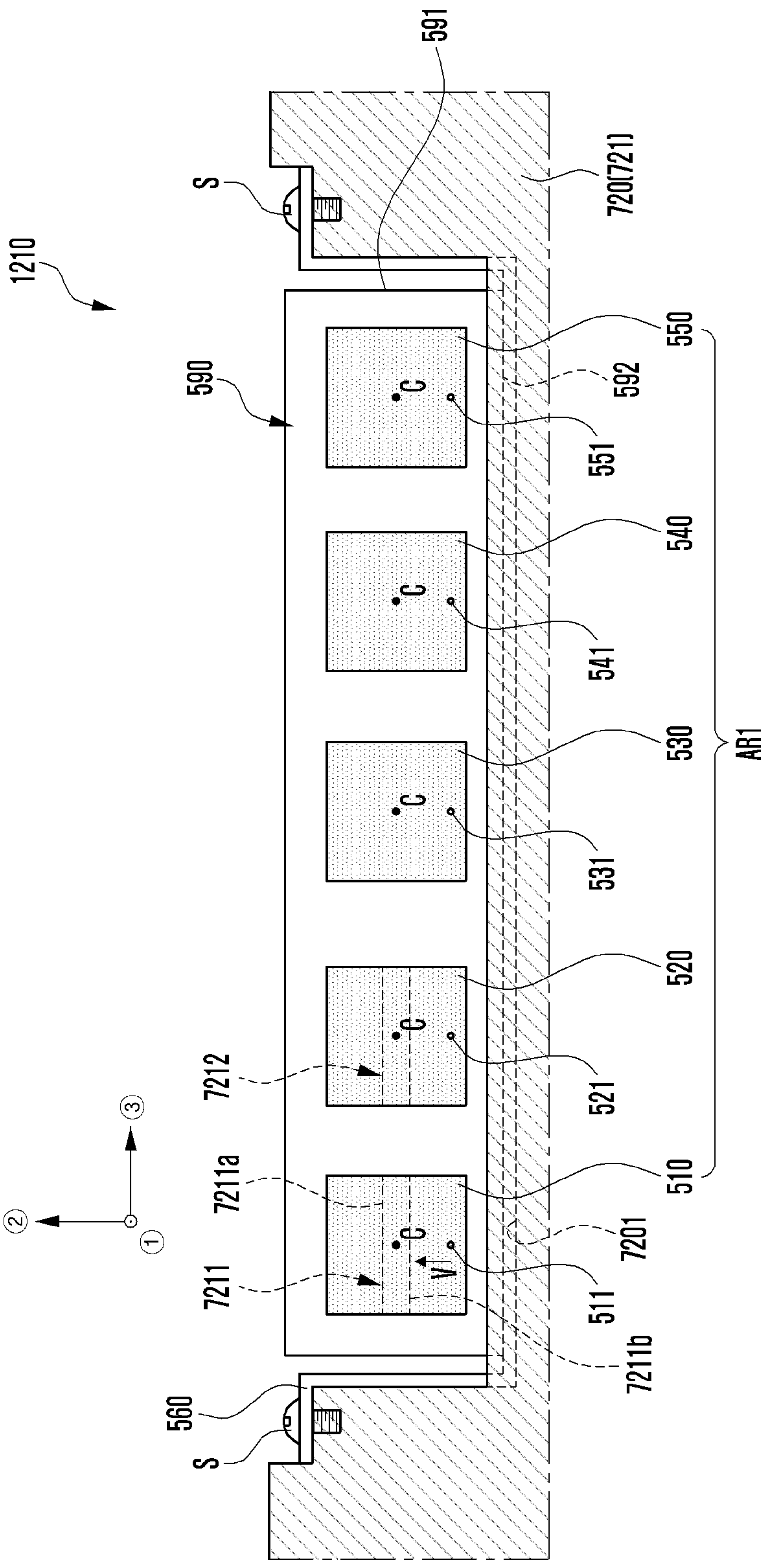
FIGS. 12A and 12B are diagrams illustrating various disposition structures of a conductive dummy plate corresponding to an antenna structure having single polarization according to various embodiments of the disclosure.
Figure 12B:
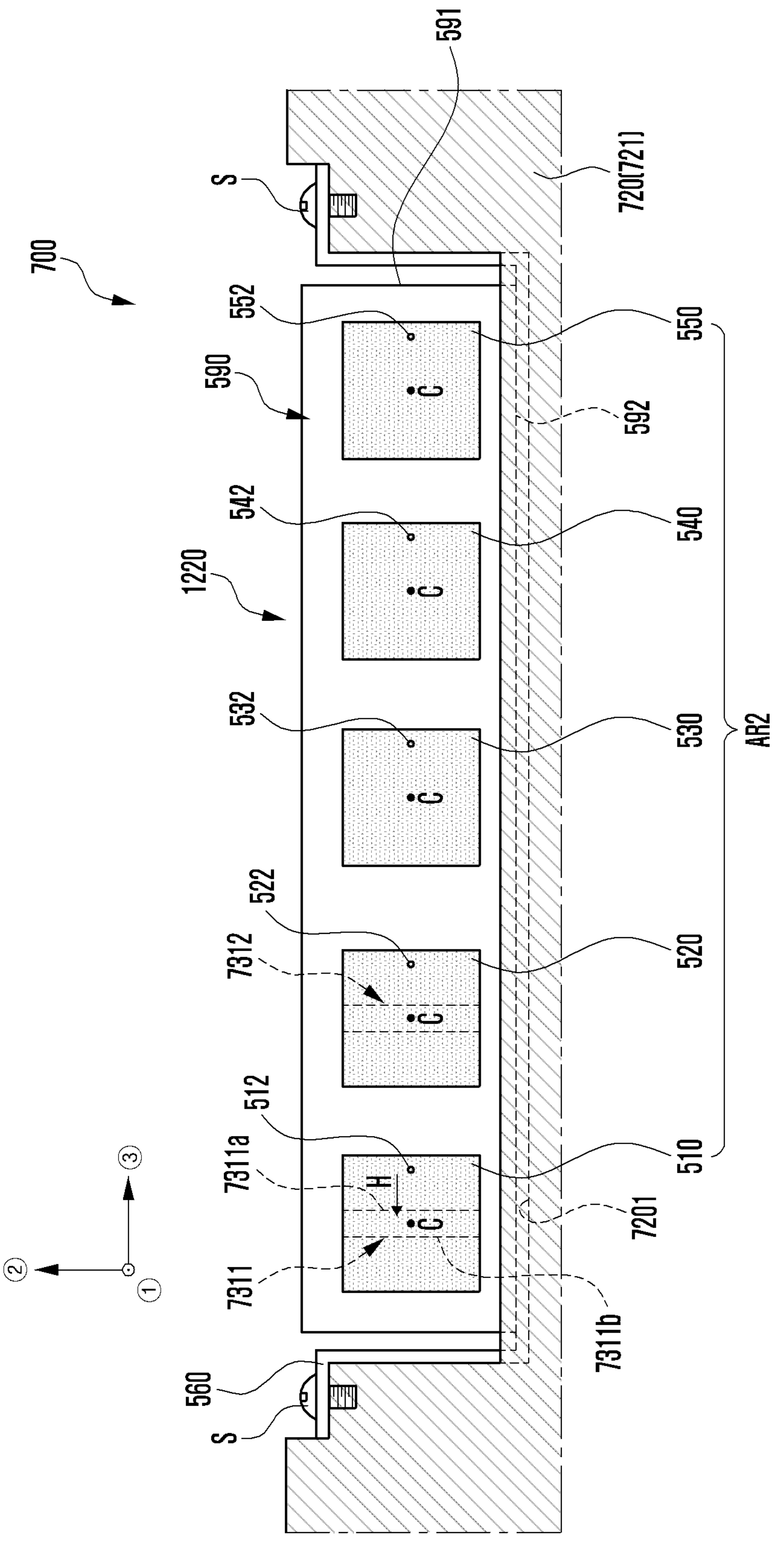

FIGS. 12A and 12B are diagrams illustrating various disposition structures of a conductive dummy plate corresponding to an antenna structure having single polarization according to various embodiments of the disclosure. FIGS. 12A and 12B illustrate an antenna structure 1210 having single polarization.

In describing an electronic device 700 of FIGS. 12A and 12B, the same reference numerals are assigned to substantially the same components as those of the electronic device 700 of FIG. 7C, and a detailed description thereof may be omitted.

Referring to FIG. 12A, the electronic device 700 may include an antenna structure 1210 as an array antenna AR1 including a first conductive patch 510 including a first feeding part 511 (e.g., the first feeding part 511 of FIG. 5A), a second conductive patch 520 including a third feeding part 521 (e.g., the third feeding part 521 of FIG. 5A), a third conductive patch 530 including a fifth feeding part 531 (e.g., the fifth feeding part 531 of FIG. 5A), a fourth conductive patch 540 including a seventh feeding part 541 (e.g., the seventh feeding part 541 of FIG. 5A), or a fifth conductive patch 550 including a ninth feeding part 551 (e.g., the ninth feeding part 551 of FIG. 5A). According to an embodiment, the electronic device 700 may include a first conductive dummy plate 7211 disposed in an area corresponding to the first conductive patch 510 of the antenna structure 1210 and a second conductive dummy plate 7212 disposed in an area corresponding to the second conductive patch 520. According to an embodiment, the first conductive dummy plate 7211 may have a length in a direction (direction ③) perpendicular to a polarization direction (V direction) formed through the first feeding part 511, and be disposed so that a first plate surface 7211*a* faces in a direction (direction ②) perpendicular to a direction (direction ①) in which a surface of the first conductive patch 510 faces. According to an embodiment, the second conductive dummy plate 7212 may also be disposed to have a length in a direction perpendicular to polarization formed through the third feeding part 521.

Referring to FIG. 12B, the electronic device 700 may include an antenna structure 1220 as an array antenna AR2 including a first conductive patch 510 including a second feeding part 512 (e.g., the second feeding part 512 of FIG. 5A), a second conductive patch 520 including a fourth feeding part 522 (e.g., the fourth feeding part 522 of FIG. 5A), a third conductive patch 530 including a sixth feeding part 532 (e.g., the sixth feeding part 532 of FIG. 5A), a fourth conductive patch 540 including an eighth feeding part 542 (e.g., the eighth feeding part 542 of FIG. 5A), or a fifth conductive patch 550 including a tenth feeding part 552 (e.g., the tenth feeding part 552 of FIG. 5A). According to an embodiment, the electronic device 700 may include a first conductive dummy plate 7311 disposed in an area corresponding to the first conductive patch 510 of the antenna structure 1220 and a second conductive dummy plate 7312 disposed in an area corresponding to the second conductive patch 520. According to an embodiment, the first conductive dummy plate 7311 may have a length in a direction (direction ②) perpendicular to a polarization direction (direction H) formed through the second feeding part 512, and be disposed so that a first plate surface 7311*a* faces in a direction (direction ③) perpendicular to a direction (direction ①) in which a surface of the first conductive patch 510 faces. According to an embodiment, the second conductive dummy plate 7312 may also be disposed to have a length in a direction perpendicular to polarization formed through the fourth feeding part 522.

Figure 13:
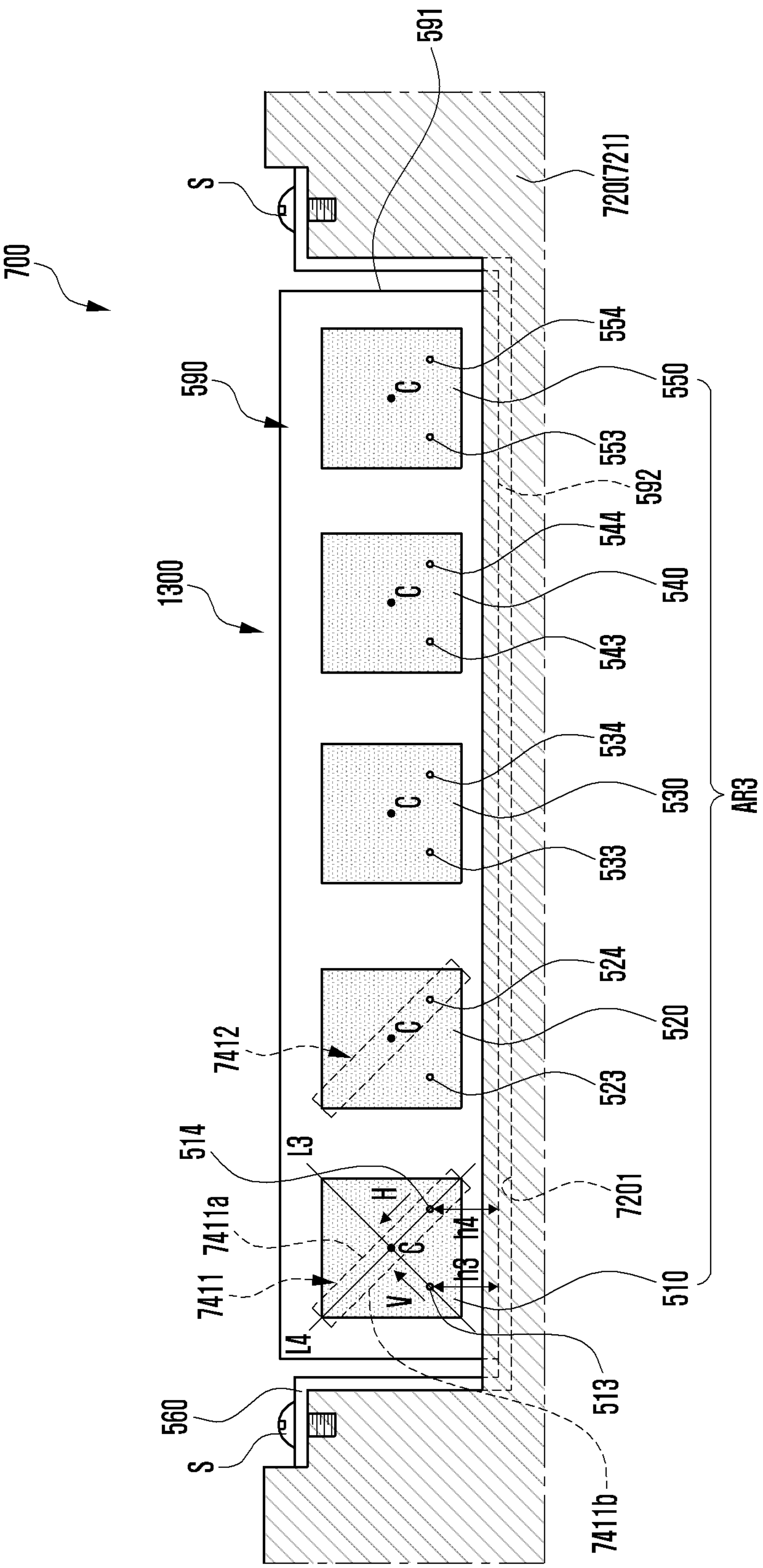
FIG. 13 is a diagram illustrating a disposition relationship of an antenna structure having double polarization and a corresponding conductive dummy plate according to an embodiment of the disclosure.

FIG. 13 is a diagram illustrating a disposition relationship of an antenna structure having double polarization and a corresponding conductive dummy plate according to an embodiment of the disclosure.

In describing the electronic device 700 of FIG. 13, the same reference numerals are given to substantially the same components as those of the electronic device 700 of FIG. 7C, and a detailed description thereof may be omitted.

Referring to FIG. 13, the electronic device may include an antenna structure 1300 including at least one antenna element 510, 520, 530, 540, and 550. According to an embodiment, the antenna structure 1300 is an array antenna AR3, and may include a substrate 590 and a plurality of conductive patches 510, 520, 530, 540, and 550 disposed at a specified interval in the substrate 590. According to an embodiment, the plurality of conductive patches 510, 520, 530, 540, and 550 may include a first conductive patch 510, a second conductive patch 520, a third conductive patch 530, a fourth conductive patch 540, or a fifth conductive patch 550 disposed at a specified interval on the substrate 590. According to an embodiment, the antenna structure 1300 may include a first feeding part 513 disposed at a first point of the first conductive patch 510 and a second feeding part 514 disposed at a second point spaced apart from the first feeding part 513. According to an embodiment, the first feeding part 513 may be disposed on a first imaginary line L3 passing through the center C of the first conductive patch 510. According to an embodiment, the second feeding part 514 may be disposed on a second imaginary line L4 passing through the center C of the first conductive patch 510 and vertically intersecting a first imaginary line L3. According to an embodiment, the antenna structure 1300 may include a third feeding part 523 and fourth feeding part 524 disposed in the second conductive patch 520 in substantially the same manner as the disposition structure of the first feeding part 513 and the second feeding part 514 disposed in the first conductive patch 510. According to an embodiment, the antenna structure 1300 may include a fifth feeding part 533 and sixth feeding part 534 disposed in the third conductive patch 530 in substantially the same manner as a disposition structure of the first feeding part 513 and the second feeding part 514 disposed in the first conductive patch 510. According to an embodiment, the antenna structure 1300 may include a seventh feeding part 543 and eighth feeding part 544 disposed in the fourth conductive patch 540 in substantially the same manner as the disposition structure of the first feeding part 513 and the second feeding part 514 disposed in the first conductive patch 510. According to an embodiment, the antenna structure 1300 may include a ninth feeding part 553 and tenth feeding part 554 disposed in the fifth conductive patch 550 in substantially the same as the disposition structure of the first feeding part 513 and the second feeding part 514 disposed in the first conductive patch 510. According to an embodiment, the first feeding part 513 and the second feeding part 514 may be disposed so that a first distance h3 and a second distance h4 to a long side 592 of the substrate 590 are substantially the same. For example, the third feeding part 523 and the fourth feeding part 524, the fifth feeding part 533 and the sixth feeding part 534, the seventh feeding part 543 and the eighth feeding part 544, or the ninth feeding part 553 and the tenth feeding part 554 may also be disposed in substantially the same manner. Accordingly, the antenna structure 1300 may operate as an antenna array AR3 through the first conductive patch 510, the second conductive patch 520, the third conductive patch 530, the fourth conductive patch 540, or the fifth conductive patch 550. For example, the wireless communication circuit (e.g., the wireless communication circuit 595 of FIG. 5B) may be configured to form first polarization (e.g., vertical polarization V) through the first feeding part 513, the third feeding part 523, the fifth feeding part 533, the seventh feeding part 543, or the ninth feeding part 553, and be configured to form second polarization (e.g., horizontal polarization H) in a direction perpendicular to first polarization through the second feeding part 514, the fourth feeding part 524, the sixth feeding part 534, the eighth feeding part 544, or the tenth feeding part 554. According to an embodiment, the wireless communication circuit (e.g., the wireless communication circuit 595 of FIG. 5B) may be configured to transmit and/or receive a wireless signal in a frequency band in a range from about 3 GHz to about 300 GHz through the array antenna AR.

According to various embodiments, the electronic device 700 may include a first conductive dummy plate 7411 disposed at a position corresponding to the first conductive patch 510 and a second conductive patch 7412 disposed at a position corresponding to the second conductive patch 520. According to an embodiment, the first conductive dummy plate 7411 may include a first plate surface 7411*a* and a second plate surface 7411*b* facing in a direction opposite to that of the first plate surface 7411*a*. According to an embodiment, the first conductive dummy plate 7411 may be disposed to have a length in a direction perpendicular to that of first polarization V formed through the first feeding part 513, and be disposed so that the first plate surface 7411*a* faces in a direction perpendicular to a direction in which a surface of the first conductive patch 510 faces. According to an embodiment, the second conductive dummy plate 7412 may also be disposed in an area corresponding to the second conductive patch 7412 so as to have substantially the same disposition structure as that of the first conductive dummy plate 7411.

FIGS. 14A to 14D are diagrams illustrating various disposition structures of a conductive dummy plate corresponding to an antenna structure according to various embodiments of the disclosure.

Figure 14A:
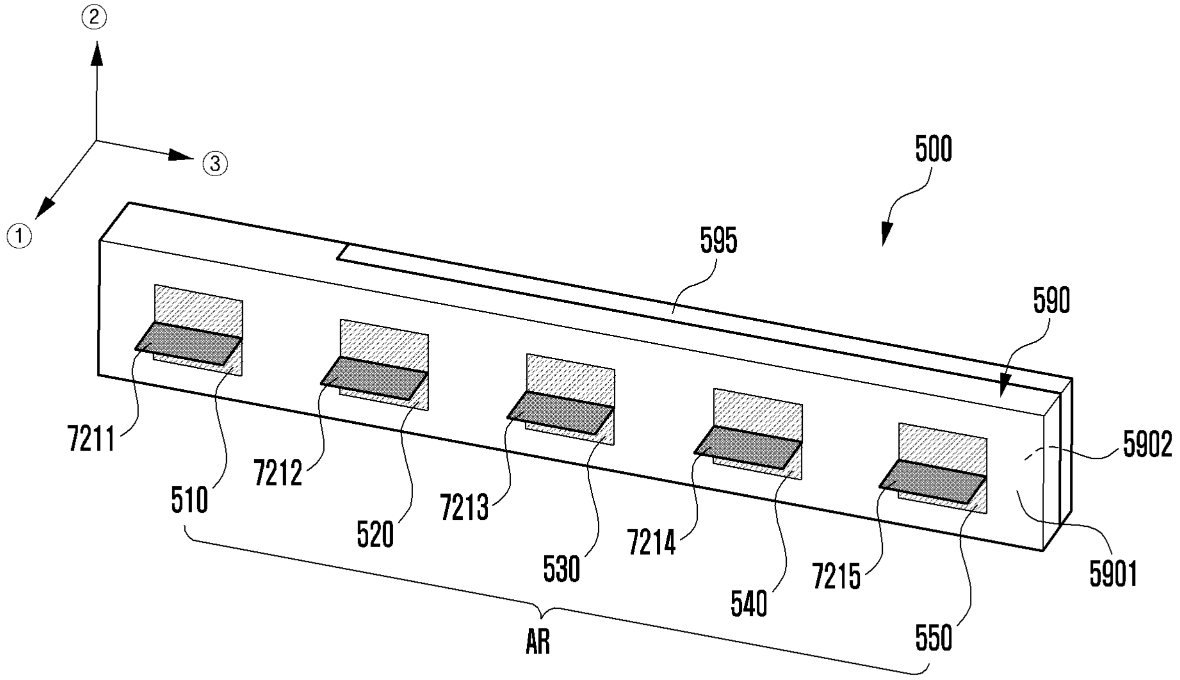
FIGS. 14A, 14B, 14C, and 14D are diagrams illustrating various disposition structures of a conductive dummy plate corresponding to an antenna structure according to various embodiments of the disclosure.
Figure 14B:
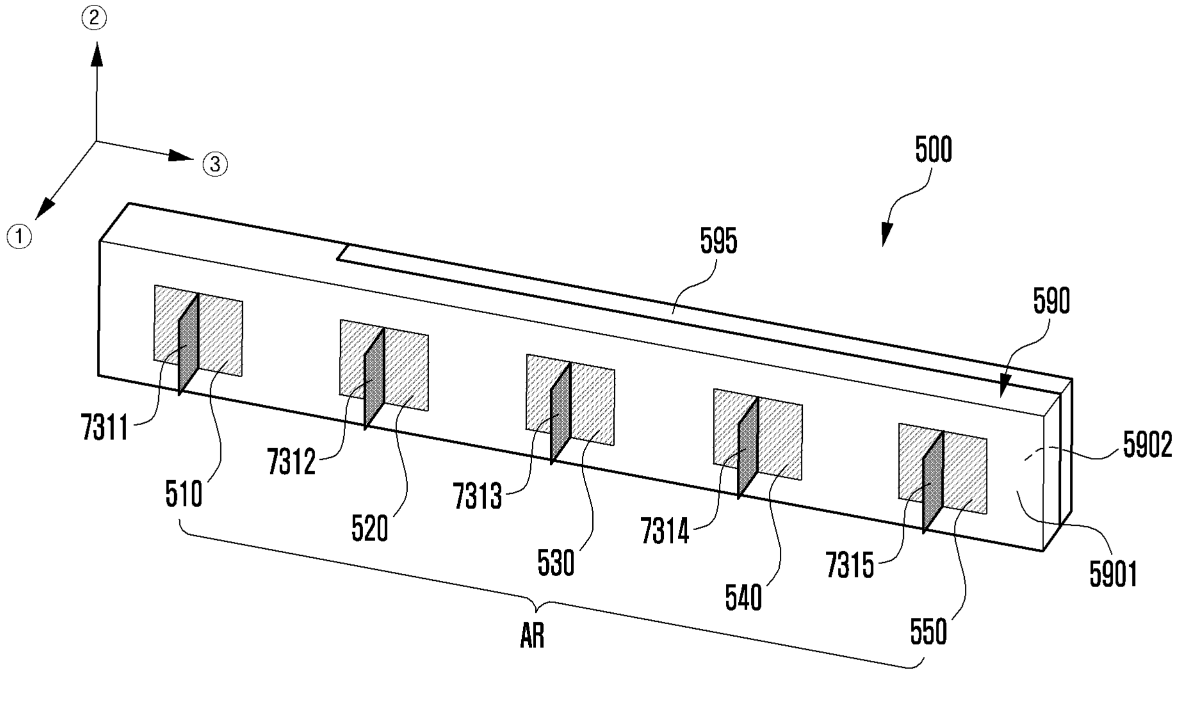
Figure 14C:
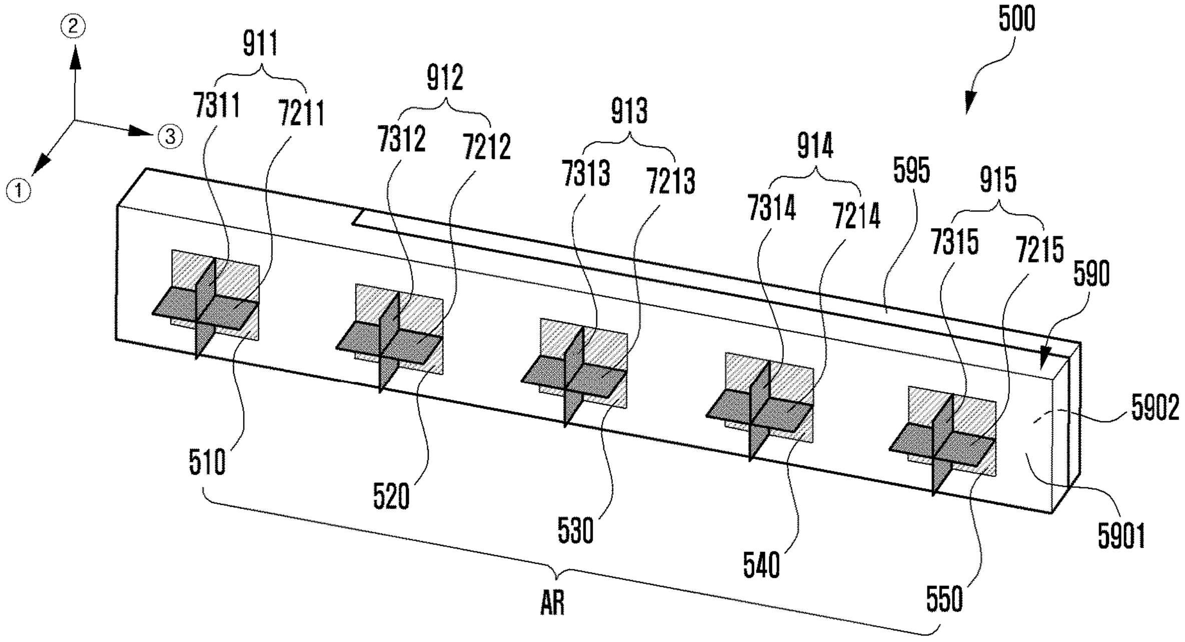
Figure 14D:
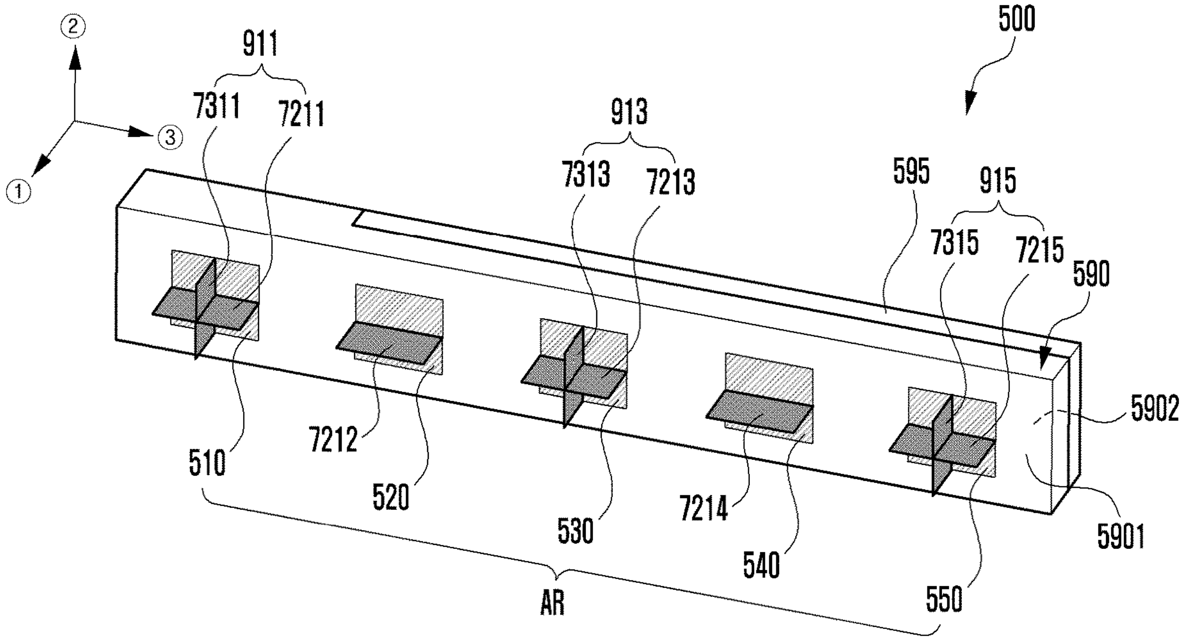

In describing the antenna structure 500 of FIGS. 14A and 14D, the same reference numerals are given to substantially the same components as those of the antenna structure of FIG. 5A, and a detailed description thereof may be omitted.

Referring to FIG. 14A, at least one conductive dummy plate 7211, 7212, 7213, 7214, and 7215 may include a first conductive dummy plate 7211, a second conductive dummy plate 7212, a third conductive dummy plate 7213, a fourth conductive dummy plate 7214, or a fifth conductive dummy plate 7215 disposed in an area corresponding to the plurality of conductive patches 510, 520, 530, 540, and 550, respectively. According to an embodiment, the first, second, third, fourth, and fifth conductive dummy plates 7211, 7212, 7213, 7214, and 7215 may be disposed to have a length in a direction (direction ③) perpendicular to a first polarization direction (direction ②) formed through the first, third, fifth, seventh, and ninth feeding parts (e.g., the feeding parts 511, 521, 531, 541, and 551 of FIG. 5A).

Referring to FIG. 14B, at least one conductive dummy plate 7311, 7312, 7313, 7314, and 7315 may include a first conductive dummy plate 7311, a second conductive dummy plate 7312, a third conductive dummy plate 7313, a fourth conductive dummy plate 7314, and a fifth conductive dummy plate 7315 disposed in an area corresponding to the plurality of conductive patches 510, 520, 530, 540, and 550, respectively. According to an embodiment, the first, second, third, fourth, and fifth conductive dummy plates 7311, 7312, 7313, 7314, and 7315 may be disposed to have a length in a direction (direction ②) perpendicular to a first polarization direction (direction ③) formed through the second, fourth, sixth, eighth, and tenth feeding parts (e.g., the feeding parts 512, 522, 532, 542, and 552 of FIG. 5A).

Referring to FIG. 14C, the electronic device (e.g., the electronic device 700 of FIG. 7A) may include a first cross type plate 7311, a second cross type plate 7312, a third cross type plate 7313, a fourth cross type plate 7314, or a fifth cross type plate 7315 disposed in an area corresponding to the plurality of conductive patches 510, 520, 530, 540, and 550, respectively. According to an embodiment, a first cross type dummy plate 911 may include a first sub-plate 7211 having a length in a direction (direction ③) perpendicular to first polarization (e.g., vertical polarization) formed by the first feeding part (e.g., the first feeding part 511 of FIG. 5A) and a second sub-plate 7311 vertically intersecting the first sub-plate 7211 and having a length in a direction (direction ②) perpendicular to second polarization (e.g., horizontal polarization) formed by the second feeding part 512. According to an embodiment, the second cross type dummy plate 912 may include a third sub-plate 7212 and fourth sub-plate 7312 formed in substantially the same manner as that of the first cross type dummy plate 911. According to an embodiment, the third cross type dummy plate 913 may include a fifth sub-plate 7213 and sixth sub-plate 7313 formed in substantially the same manner as that of the first cross type dummy plate 911. According to an embodiment, the fourth cross type dummy plate 914 may include a seventh sub-plate 7214 and eighth sub-plate 7314 formed in substantially the same manner as that of the first cross type dummy plate 911. According to an embodiment, the fifth cross type dummy plate 915 may include a ninth sub-plate 7215 and tenth sub-plate 7315 formed in substantially the same manner as that of the first cross type dummy plate 911.

Referring to FIG. 14D, an electronic device (e.g., the electronic device 700 of FIG. 7A) may include dummy plates in which the conductive dummy plates 7212 and 7214 of FIG. 14A and the cross type dummy plates 911, 913, and 915 of FIG. 14C are formed by mixing. According to an embodiment, the electronic device (e.g., the electronic device 700 of FIG. 7A) may include a first cross type dummy plate 911 disposed at a position corresponding to the first conductive patch 510, a second conductive dummy plate 7212 disposed at a position corresponding to the second conductive patch 520, a third cross type dummy plate 913 disposed at a position corresponding to the third conductive patch 530, a fourth conductive dummy plate 7214 disposed at a position corresponding to the fourth conductive patch 540, or a fifth cross type dummy plate 915 disposed at a position corresponding to the fifth conductive patch 550. In some embodiments, the electronic device (e.g., the electronic device 700 of FIG. 7A) may include dummy plates formed by mixing at least one conductive dummy plate of the conductive dummy plates 7311, 7312, 7313, 7314, and 7315 of FIG. 14B and at least one cross type dummy plate of the cross type dummy plates 911, 912, 913, 914, and 915 of FIG. 14C.

Referring to Table 2, in a 50% section of a cumulative distribution function (CDF), in FIGS. 14A to 14D in which conductive dummy plates are applied in various methods, the antenna structure 500 of FIGS. 14A to 14D operating in a low frequency band (n261 band) exhibits a gain of 2.1 dB, 3.6 dB, 3.8 dB, and 2.8 dB, but it can be seen that a radiation performance was improved compared to a gain of 1.8 dB before the conductive dummy plates are applied. Further, in a high frequency band (n260 band), in a 50% section of the CDF, in FIGS. 14A to 14D to which conductive dummy plates are applied in various methods, the antenna structure 500 exhibits a gain of 3.1 dB, 3.7 dB, 3.7 dB and 2.0 dB, but it can be seen that a radiation performance was improved compared to the gain of 2.8 dB before the conductive dummy plates are applied.

TABLE 2

| | Frequency | | | |
|---|---|---|---|---|
| | n261(28 GHz) | | n260(39 GHz) | |
| Gain CDF | CDF 50% | peak | CDF 50% | peak |
| Not applied | 1.8 | 8.3 | 2.8 | 10.4 |
| FIG. 14A | 2.1 | 8.7 | 3.1 | 10.6 |
| FIG. 14B | 3.6 | 8.3 | 3.7 | 9.6 |
| FIG. 14C | 3.8 | 8.8 | 3.7 | 10.4 |
| FIG. 14D | 2.8 | 8.7 | 3.0 | 10.5 |

According to various embodiments, an electronic device (e.g., the electronic device 700 of FIG. 7A) includes a housing (e.g., the housing 710 of FIG. 7A) including a conductive part (e.g., the conductive part 721 of FIG. 7A) and a non-conductive part (e.g., the non-conductive part 722 of FIG. 7A) coupled to the conductive part, an antenna structure (e.g., the antenna structure 500 of FIG. 7A) including a substrate (e.g., the substrate 590 of FIG. 7A) disposed in an internal space (e.g., the internal space 7001 of FIG. 7A) of the housing and at least one antenna element (e.g., the array antenna AR of FIG. 7A) disposed to form a beam pattern in a first direction (direction ①) in the substrate, at least one conductive dummy plate (e.g., the conductive dummy plate 7212 of FIG. 7A) disposed between the at least one antenna element and the housing in the internal space of the housing, and a wireless communication circuit (e.g., the wireless communication circuit 595 of FIG. 5B) configured to transmit and/or receive a wireless signal in a specified frequency band through the at least one antenna element, wherein the antenna structure is disposed at a position at least partially overlapped with the non-conductive part when the housing is viewed from the outside, and the at least one conductive dummy plate is disposed at a position at least partially overlapped with the at least one antenna element when the housing is viewed from the outside.

According to various embodiments, a distance between the at least one conductive dummy plate and the at least one antenna element may include a range of 0.01λ, to 1λ.

According to various embodiments, when the housing is viewed from the outside, the at least one conductive dummy plate may be disposed at a position overlapped with a center of the at least one antenna element.

According to various embodiments, when the housing is viewed from the outside, the at least one conductive dummy plate may be formed to have substantially the same length as that of the at least one antenna element.

According to various embodiments, the housing may be disposed to be at least partially visible from the outside through a side member and include a side surface facing in the first direction, and the substrate may be disposed to form a beam pattern in the first direction in the internal space of the housing.

According to various embodiments, the at least one conductive dummy plate may be extended at least partially from the side member formed with the conductive part to the internal space.

According to various embodiments, the electronic device may further include at least one segmented part disposed through the non-conductive part at a position at least partially overlapped with the antenna structure when the side surface is viewed from the outside, wherein the at least one conductive dummy plate may be disposed near the segmented part.

According to various embodiments, the electronic device may further include a support structure disposed in the internal space of the housing, wherein the at least one conductive dummy plate may be disposed at the support structure.

According to various embodiments, the support structure may include an injection-molded product, and the at least one conductive dummy plate may be embedded in the injection-molded product or disposed at an outer surface of the injection-molded product.

According to various embodiments, the at least one conductive dummy plate may be used as another antenna radiator.

According to various embodiments, the at least one conductive dummy plate may include a first plate surface and a second plate surface facing in a direction opposite to that of the first plate surface, and the at least one conductive dummy plate may be disposed so that the first plate surface faces in a second direction perpendicular to the first direction.

According to various embodiments, the at least one antenna element may include at least one feeding part, and the at least one conductive dummy plate may be disposed to have a length in a direction orthogonal to a polarization direction through the at least one feeding part.

According to various embodiments, the at least one feeding part may include a first feeding part disposed on a first imaginary line passing through the center of the at least one antenna element and configured to form vertical polarization and a second feeding part configured to pass through the center and disposed on a second imaginary line orthogonal to the first imaginary line and to form horizontal polarization.

According to various embodiments, the at least one conductive dummy plate may be disposed to have a length in a direction perpendicular to a polarization direction of the first feeding part.

According to various embodiments, the at least one antenna element may include a plurality of antenna elements disposed at a specified interval, and the at least one dummy plate may be formed in the number corresponding to each of the plurality of antenna elements.

According to various embodiments, the at least one antenna element may include a plurality of antenna elements disposed at a specified interval, and the at least one dummy plate may be formed in the number corresponding to at least one antenna element of the plurality of antenna elements.

According to various embodiments, the housing may include a front plate; a rear plate configured to face in a direction opposite to that of the front plate; a side member configured to enclose an internal space between the front plate and the rear plate; and a display disposed in the internal space and disposed to be visible at least partially from the outside through the front plate.

According to various embodiments, the substrate may be disposed to form a beam pattern in a direction in which the side member and/or the rear plate face(s).

According to various embodiments, the at least one conductive dummy plate enables generating an image source or image current of a vertical polarization source to expand a beam width of the beam pattern.

According to various embodiments, the at least one conductive dummy plate comprises a cross type dummy plate disposed to correspond to a first conductive patch of the antenna structure.

According to various embodiments, the cross type dummy plate comprises a first sub-plate having a length in a direction perpendicular to a first polarization formed by a first feeding part, and a second sub-plate vertically intersecting the first sub-plate and having a length in a direction perpendicular to a second polarization formed by a second feeding part.

According to various embodiments, an electronic device (e.g., the electronic device 700 of FIG. 10) includes a housing (e.g., the housing 710 of FIG. 10) including a conductive part (e.g., the conductive part 721 of FIG. 10) and a non-conductive part (e.g., the non-conductive part 722 of FIG. 10) coupled to the conductive part; an antenna structure (e.g., the antenna structure 500-1 of FIG. 10) disposed in the housing, wherein the antenna structure includes a dielectric structure (e.g., the dielectric structure 590-1 of FIG. 10); at least one conductive patch (e.g., the array antenna AR of FIG. 10) disposed to form a beam pattern in a first direction (direction ①) in the dielectric structure; and at least one conductive dummy plate (e.g., the conductive dummy plate 830 of FIG. 10) disposed between the at least one conductive patch and the housing in the dielectric structure; and a wireless communication circuit (e.g., the wireless communication circuit 595 of FIG. 5B) configured to transmit and/or receive a wireless signal in a specified frequency band through the at least one conductive patch, wherein the antenna structure is disposed at a position at least partially overlapped with the non-conductive part when the housing is viewed from the outside, and the at least one conductive dummy plate is disposed at a position at least partially overlapped with the at least one conductive patch when the housing is viewed from the outside.

According to various embodiments, the at least one conductive dummy plate may include a first plate surface and a second plate surface facing in a direction opposite to that of the first plate surface, and the at least one conductive dummy plate may be disposed so that the first plate surface faces in a direction perpendicular to a direction in which a surface of the at least one conductive patch faces.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising:

a housing comprising a conductive part and a non-conductive part coupled to the conductive part;

an antenna structure comprising a substrate disposed in an internal space of the housing and at least one antenna element disposed to form a beam pattern in a first direction in the substrate;

at least one conductive dummy plate disposed between the at least one antenna element and the housing in the internal space of the housing; and a wireless communication circuit configured to transmit and/or receive a wireless signal in a specified frequency band through the at least one antenna element, wherein the antenna structure is disposed at a position at least partially overlapped with the non-conductive part when the housing is viewed from an outside of the electronic device, wherein the at least one conductive dummy plate is disposed at a position at least partially overlapped with the at least one antenna element when the housing is viewed from the outside of the electronic device, and wherein the at least one conductive dummy plate is disposed at a position spaced apart from the substrate in the internal space of the housing.

2. The electronic device of claim 1, wherein a distance between the at least one conductive dummy plate and the at least one antenna element comprises a range of 0.01λ to 1λ.

3. The electronic device of claim 1, wherein the at least one conductive dummy plate is disposed at a position overlapped with a center of the at least one antenna element when the housing is viewed from the outside of the electronic device.

4. The electronic device of claim 1, wherein the at least one conductive dummy plate is formed to have substantially a same length as that of the at least one antenna element when the housing is viewed from the outside of the electronic device.

5. The electronic device of claim 1, wherein the housing is disposed to be at least partially visible from the outside of the electronic device through a side member and comprises a side surface facing in the first direction.

6. The electronic device of claim 5, wherein the at least one conductive dummy plate is extended at least partially from the side member formed with the conductive part to the internal space.

7. The electronic device of claim 6, further comprising:

at least one segmented part disposed through the non-conductive part at a position at least partially overlapped with the antenna structure when the side surface is viewed from the outside of the electronic device, wherein the at least one conductive dummy plate is disposed near the segmented part.

8. The electronic device of claim 1, further comprising:

a support structure disposed in the internal space of the housing, wherein the at least one conductive dummy plate is disposed at the support structure.

9. The electronic device of claim 8, wherein the support structure comprises an injection-molded product, and wherein the at least one conductive dummy plate is embedded in the injection-molded product or is disposed at an outer surface of the injection-molded product.

10. The electronic device of claim 9, wherein the at least one conductive dummy plate functions as another antenna radiator.

11. The electronic device of claim 1, wherein the at least one conductive dummy plate comprises a first plate surface and a second plate surface facing in a direction opposite to that of the first plate surface, and wherein the at least one conductive dummy plate is disposed so that the first plate surface faces in a second direction perpendicular to the first direction.

12. The electronic device of claim 11, wherein the at least one antenna element comprises at least one feeding part, and wherein the at least one conductive dummy plate is disposed to have a length in a direction orthogonal to a polarization direction through the at least one feeding part.

13. The electronic device of claim 12, wherein the at least one feeding part comprises:

a first feeding part disposed on a first imaginary line passing through a center of the at least one antenna element and configured to form vertical polarization, and a second feeding part configured to pass through the center and disposed on a second imaginary line orthogonal to the first imaginary line and to form horizontal polarization.

14. The electronic device of claim 13, wherein the at least one conductive dummy plate is disposed to have a length in a direction perpendicular to a polarization direction of the first feeding part.

15. The electronic device of claim 1, wherein the at least one antenna element comprises a plurality of antenna elements disposed at a specified interval, and wherein the at least one conductive dummy plate is formed in a number corresponding to a number of the plurality of antenna elements.

16. The electronic device of claim 1, wherein the at least one antenna element comprises a plurality of antenna elements disposed at a specified interval, and wherein the at least one conductive dummy plate is formed in a number corresponding to at least one antenna element of the plurality of antenna elements.

17. The electronic device of claim 1, wherein the housing comprises:

a front plate;

a rear plate configured to face in a direction opposite to that of the front plate;

a side member configured to enclose an internal space between the front plate and the rear plate; and a display disposed in the internal space and disposed to be visible at least partially from the outside of the electronic device through the front plate.

18. The electronic device of claim 17, wherein the substrate is disposed to form a beam pattern in a direction in which at least one of the side member or the rear plate faces.

19. An electronic device, comprising:

a housing comprising a conductive part and a non-conductive part coupled to the conductive part;

an antenna structure disposed in the housing, wherein the antenna structure comprises:

a dielectric structure, at least one conductive patch disposed to form a beam pattern in a first direction in the dielectric structure, and at least one conductive dummy plate disposed between the at least one conductive patch and the housing in the dielectric structure; and a wireless communication circuit configured to transmit and/or receive a wireless signal in a specified frequency band through the at least one conductive patch, wherein the antenna structure is disposed at a position at least partially overlapped with the non-conductive part when the housing is viewed from an outside of the electronic device, wherein the at least one conductive dummy plate is disposed at a position at least partially overlapped with the at least one conductive patch when the housing is viewed from the outside of the electronic device, wherein the antenna structure includes a first feeding part disposed at a first point of the at least one conductive patch and a second feeding part disposed at a second point of the at least one conductive patch spaced apart from the first feeding part, and wherein the at least one conductive dummy plate is disposed to have a length in a direction perpendicular to a vertical polarization direction formed from the first feeding part.

20. The electronic device of claim 19, wherein the at least one conductive dummy plate comprises a first plate surface and a second plate surface facing in a direction opposite to that of the first plate surface, and wherein the at least one conductive dummy plate is disposed so that the first plate surface faces in a direction perpendicular to a direction in which a surface of the at least one conductive patch faces.

* * * * *